(12) United States Patent
Takita et al.

(10) Patent No.: US 6,582,674 B1
(45) Date of Patent: Jun. 24, 2003

(54) CATALYST FOR PRODUCING CARBON AND METHOD OF PRODUCING CARBON

(75) Inventors: Yusaku Takita, Ooita (JP); Masaaki Oota, Muko (JP); Yoshifumi Kise, Ootsu (JP)

(73) Assignees: Research Institute of Innovative Technology for the Earth, Kyoto (JP); Shimadzu Corporation, Kyoto (JP)

( * ) Notice: Subject to any disclaimer, the term of this patent is extended or adjusted under 35 U.S.C. 154(b) by 0 days.

(21) Appl. No.: 09/562,738

(22) Filed: May 1, 2000

(30) Foreign Application Priority Data

May 24, 1999 (JP) .......................................... 11-143081

(51) Int. Cl.$^7$ .................................................. D01F 9/12
(52) U.S. Cl. ................................ 423/445 R; 423/447.3
(58) Field of Search ........................ 423/447.3, 445 R, 423/445 B

(56) References Cited

U.S. PATENT DOCUMENTS 3,842,113 A    10/1974  Ichikawa et al.
6,261,532 B1 *  7/2001  Ono ........................ 423/447.3

FOREIGN PATENT DOCUMENTS

JP         1-282313      * 11/1989  .............. 423/447.3

OTHER PUBLICATIONS

Ito M et al: Selective Oxidation of Methane On Supported Alakaline Metal—Nickel Catalyst oFr MCFC Reactor Applied Catalyst A: General, Elsevier Science, Amsterdam, NL, vol. 184, 1999, pp. 73–80, XP000938365 ISSN: 0926–860X.

* cited by examiner

Primary Examiner—Stuart L. Hendrickson
(74) Attorney, Agent, or Firm—Rader, Fishman & Grauer PLLC

(57) ABSTRACT

By employing a 1% potassium-added cobalt catalyst prepared by adding potassium to cobalt as a catalyst for depositing carbon from mixed gas containing a carbon source, it was possible to lower the optimum catalyst temperature from 510–520° C. to 410–430° C., increase the maximum conversion ratio from 6.8% to 18.0% and increase both of the mean conversion ratio and the carbon deposition quantity as compared with the case of employing a catalyst of simple cobalt.

9 Claims, 29 Drawing Sheets

US 6,582,674 B1

CATALYST FOR PRODUCING CARBON AND METHOD OF PRODUCING CARBON

BACKGROUND OF THE INVENTION

1. Field of the Invention

The present invention relates to a catalyst employed for producing carbon from mixed gas containing a carbon source.

2. Description of the Prior Art

In general, a carbon material such as graphite has been produced by heating an organic compound under ordinary pressure in an inert atmosphere for carbonizing the same or through incomplete combustion of hydrocarbon gas. However, production of carbon through combustion of hydrocarbon gas is problematic in consideration of shortage of the raw material, i.e., hydrocarbon gas, resulting from exhaustion of global resources, or global warming caused by carbon dioxide gas generated in combustion of hydrocarbon gas. Reduction of carbon dioxide release causing global warming is demanded on a world-wide scale.

In order to effectively utilize carbon dioxide, there is a method of producing carbon from carbon dioxide gas with a metallic catalyst. For example, Japanese Patent Laying-Open Gazette No. 63-104652 (1988) discloses a method of producing carbon from carbon dioxide gas and hydrogen gas with a catalyst of a transition metal such as Fe, Ni or Co.

However, such a transition metal catalyst is inferior in carbon producibility. While the method described in the Japanese Patent Laying-Open Gazette No. 63-104652 increases the surface area of the transition metal catalyst by oxidizing thereby improving carbon producibility in order to solve this problem, the ability of the catalyst is not yet remarkably improved. Furthermore, this method requiring a high reaction temperature of 900 to 1000° C. is still insufficient in consideration of effective utilization of energy.

SUMMARY OF THE INVENTION

Accordingly, an object of the present invention is to improve carbon producibility of a catalyst for producing carbon mainly composed of a transition metal.

The present invention provides a catalyst for producing carbon, which is employed for producing carbon by coming into contact with mixed gas containing a carbon source. The catalyst is mainly composed of at least either nickel or cobalt with; an alkaline metallic element added thereto.

A preferable example of the alkaline metallic element is potassium.

The catalyst for producing carbon mainly composed of at least either nickel or cobalt is improved in carbon producibility as compared with the conventional transition metal catalyst by adding the alkaline metallic element The present invention also provides a method of producing carbon by bringing the aforementioned catalyst according to the present invention into contact with mixed gas containing a carbon source.

When employing a catalyst mainly composed of cobalt with potassium added thereto as the alkaline metallic element, the reaction temperature is preferably 350 to 550° C., more preferably 410 to 430° C.

When employing a catalyst mainly composed of nickel with potassium added thereto as the alkaline metallic element, the reaction temperature is preferably 400 to 610° C., more preferably 480 to 600° C.

Exemplary mixed gas serving as reaction gas for producing carbon contains carbon dioxide as the carbon source. By employing carbon dioxide as the carbon source, it is possible to cope with global warming. Alternatively, other carbon compounds may also be employed as the carbon source.

When containing carbon dioxide as the carbon source, the mixed gas preferably further contains a reductant for reducing carbon dioxide by catalytic reaction and producing carbon. An exemplary reductant is hydrogen. Alternatively, other reductants may also be employed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
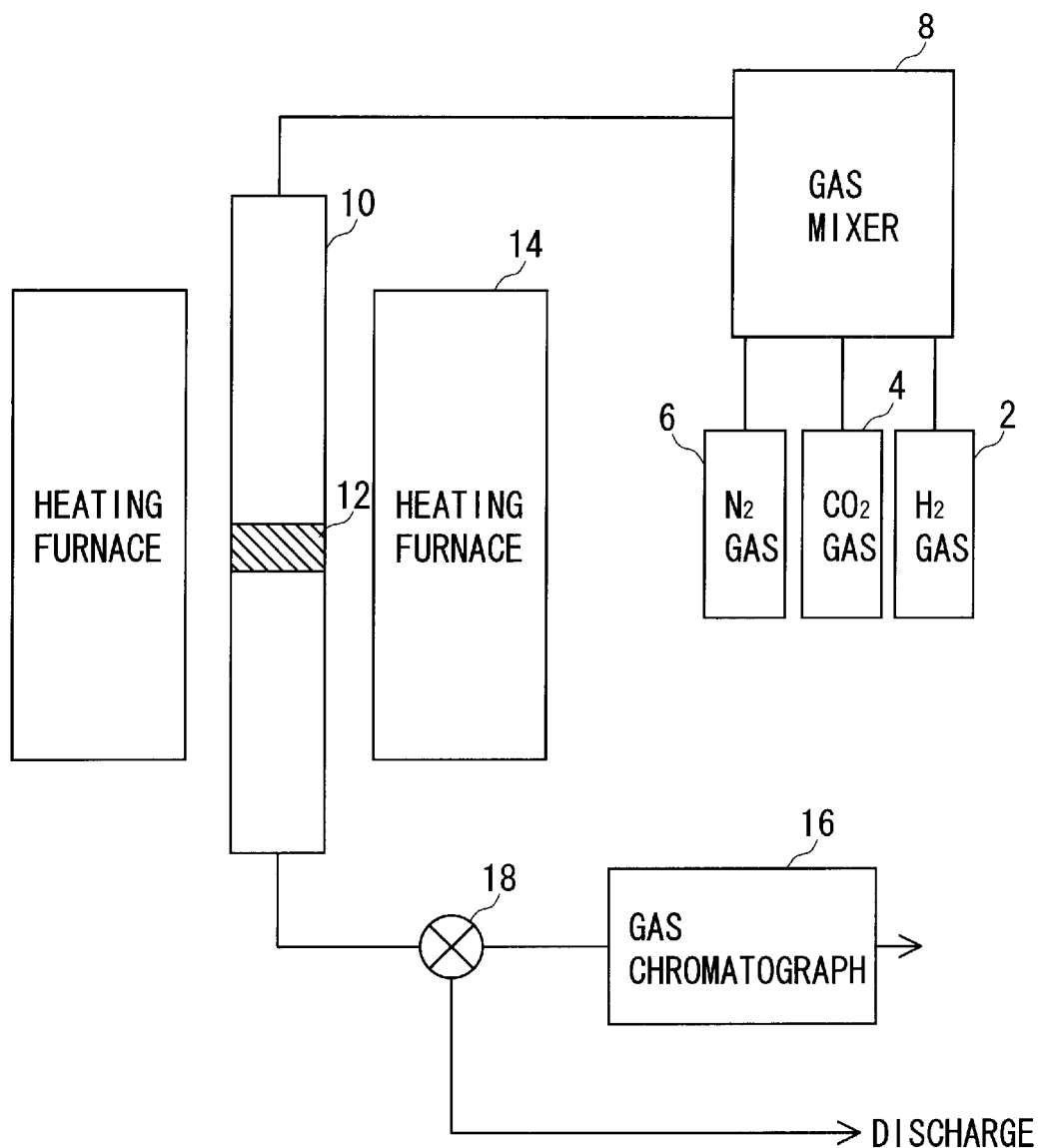
FIG. 1 is a schematic block diagram showing a fixed bed reactor charged with a catalyst for producing carbon for measuring carbon producibility.
Figure 2A:
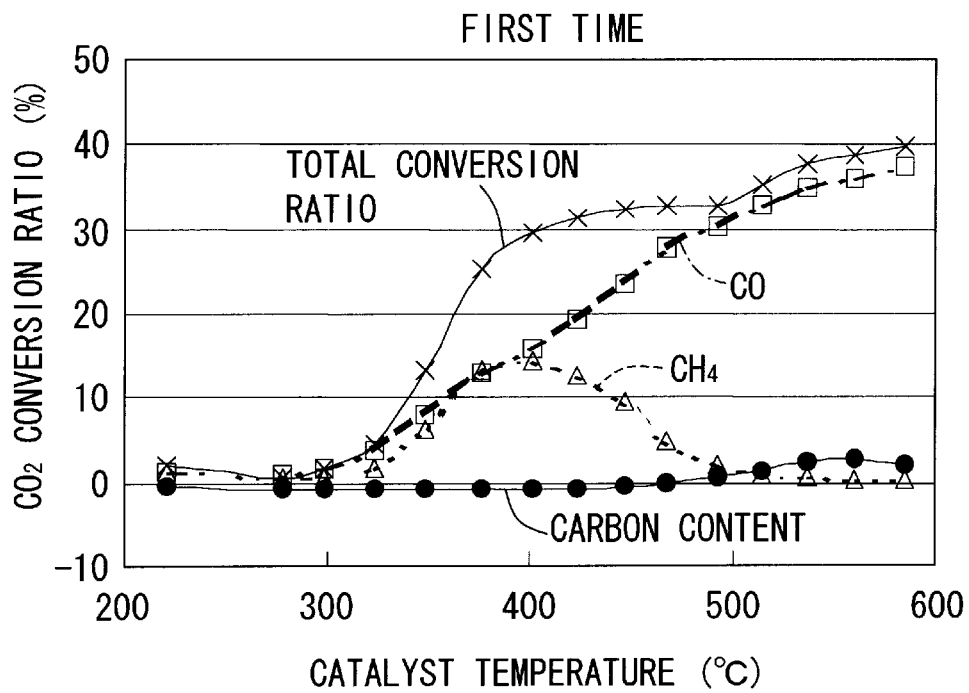
FIGS. 2A to 2E illustrate conversion ratios of carbon dioxide to respective products obtained by repetitively raising the temperature five times with a cobalt metal powder catalyst (a) in the second comparative example along with temperature programming times.
Figure 2B:
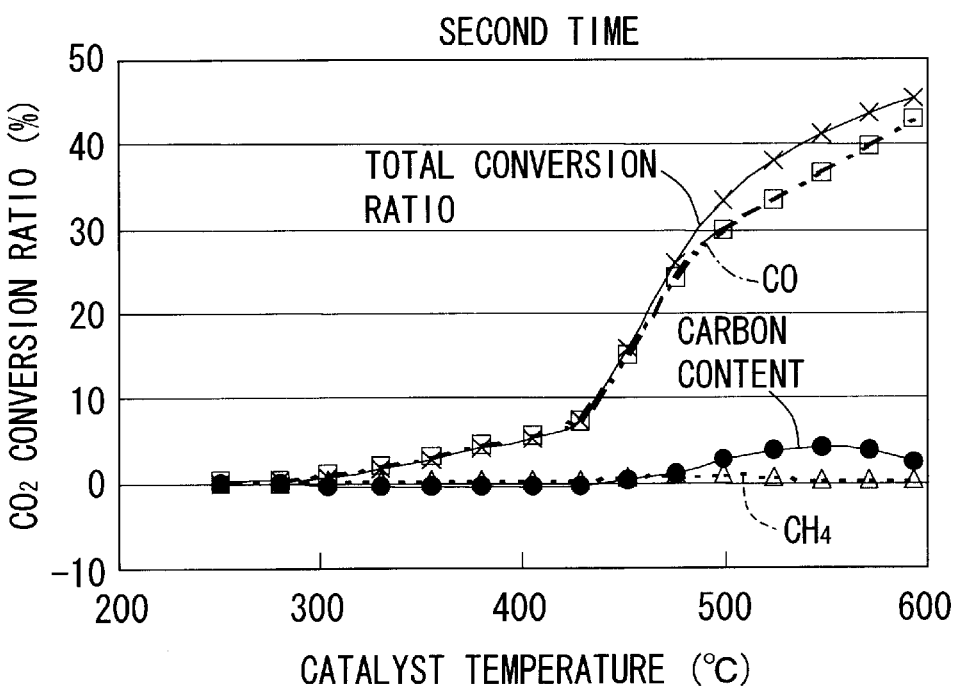
Figure 2C:
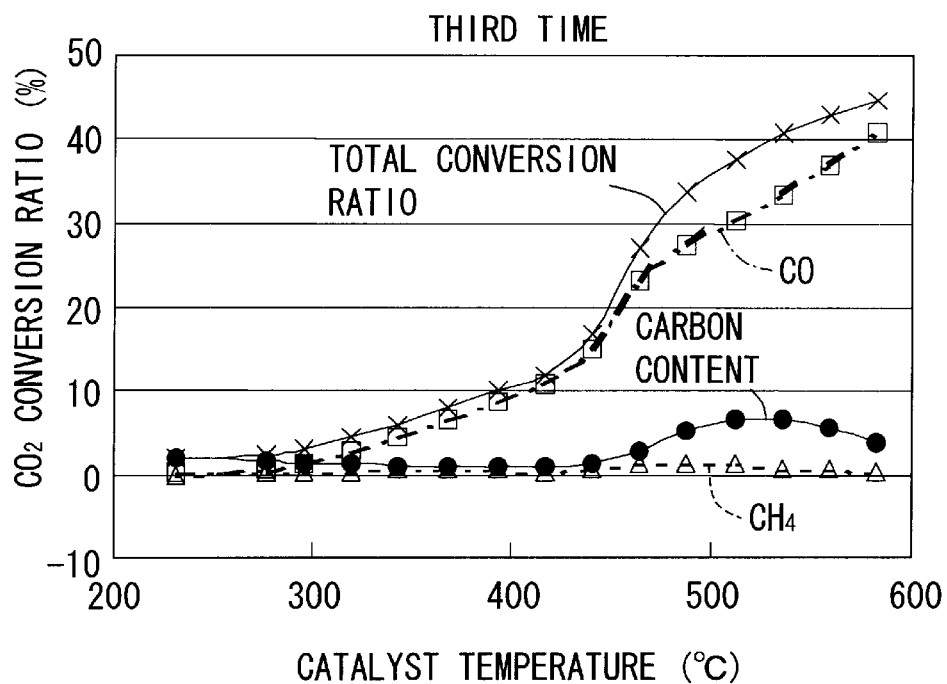
Figure 2D:
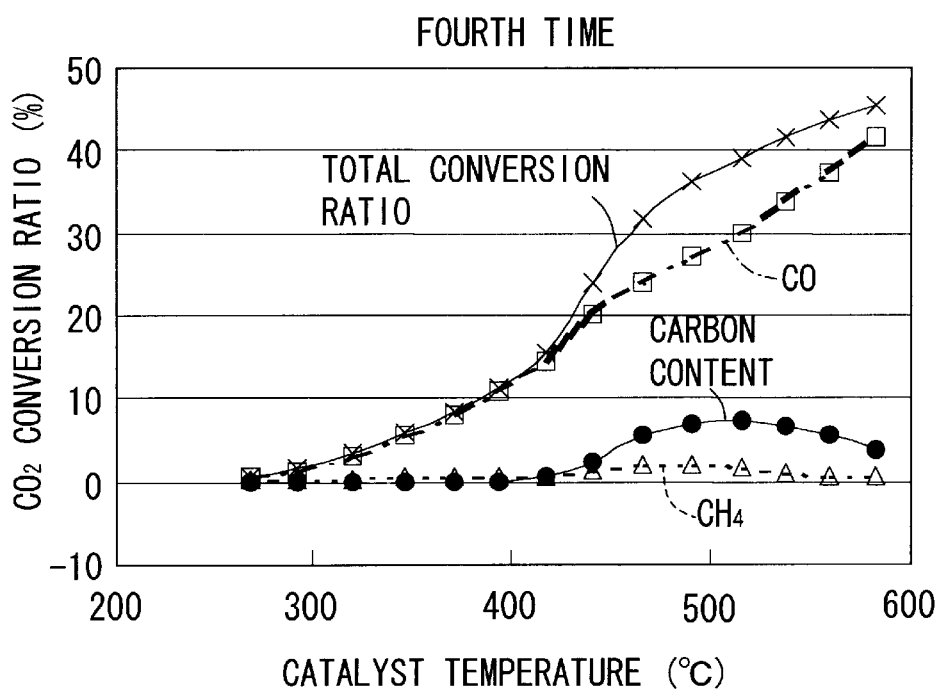
Figure 2E:
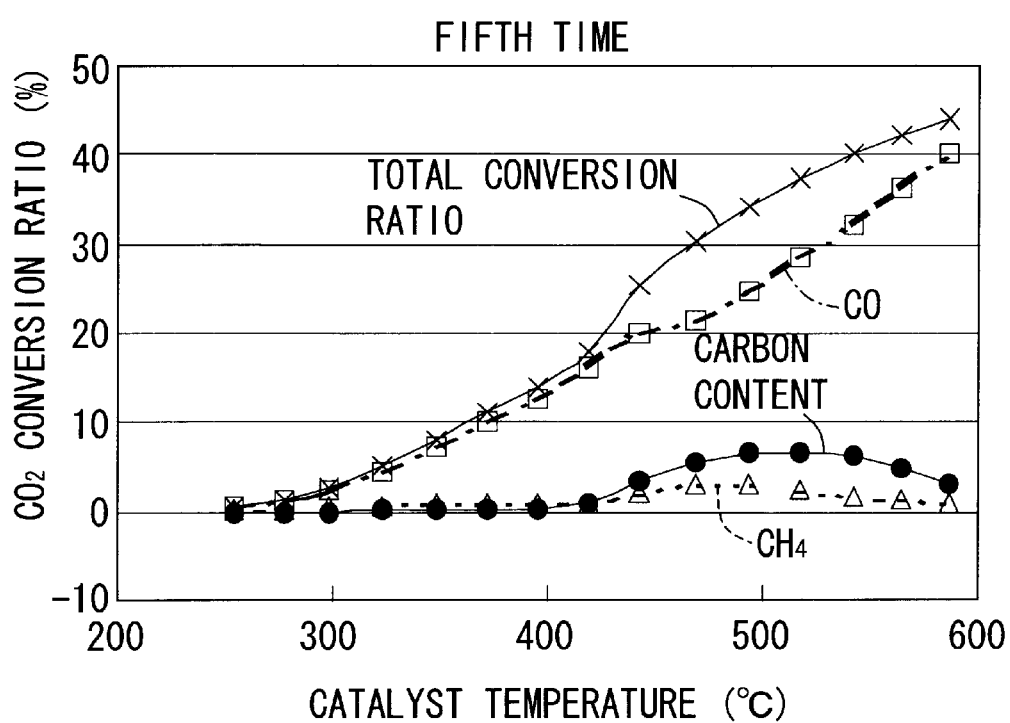

FIG. 1 is a schematic block diagram showing a fixed bed reactor charged with a catalyst for producing carbon according to the present invention for measuring carbon producibility.

A hydrogen gas cylinder 2, a carbon dioxide gas cylinder 4 and a nitrogen gas cylinder 6 are provided as gas supply sources and connected to a gas mixer 8 mixing carbon dioxide gas, hydrogen gas and nitrogen gas in prescribed ratios.

Mixed gas prepared in the gas mixer 8 is fed to a quartz reaction tube 10. The reaction tube 10 is charged with a catalyst 12 mainly composed of cobalt or nickel. Glass beads or glass wool charged in the reaction tube 10 fixes the catalyst 12. A heating furnace 14 heats the reaction tube 10 to a prescribed temperature.

The gas passing through the reaction tube 10 is discharged or switched at any time by a switching valve 18 and fed to a gas chromatograph 16. The gas chromatograph 16 measures the concentrations of carbon monoxide, carbon dioxide, nitrogen and methane.

Catalysts employed in Examples and comparative examples, and methods of preparing the same shall now be described. Cobalt metal powder of 99.0% in purity, nickel metal powder of 99.0% in purity, nickel metallic particles of 90% in purity and 16 to 62 μm in particle diameter and potassium nitrate of 99.0% in purity were employed as reagents.

(Exemplary Catalyst 1) Cobalt Metal Powder Catalyst (a)

The cobalt metal powder was used as a cobalt metal powder catalyst (a) as such.

(Exemplary Catalyst 2) Nickel Metal Powder Catalyst (b)

The nickel metal powder was used as a nickel metal powder catalyst (b) as such.

(Exemplary Catalyst 3) Nickel Metallic Particle Catalyst (c)

The nickel metallic particles were used as a nickel metallic particle catalyst (c) as such.

(Exemplary Catalyst 4) 1% Potassium-Added Cobalt Catalyst (A)

A proper quantity of potassium nitrate was put in a glass container and dissolved with addition of deionized water. Cobalt metal powder was added to the solution so that the weight ratio of potassium in potassium nitrate to the total weight of the catalyst was 1%, and the mixture was stirred in an ultrasonic cleaner with ultrasonic waves for 15 minutes and thereafter dried on a hot plate for four hours. Thereafter, the dried catalyst was moved onto a porcelain dish and baked in an electric furnace under conditions of an air atmosphere, a baking temperature of 350° C. and a baking time of four hours.

(Exemplary Catalyst 5) 1% Potassium-Added Nickel Catalyst (B)

A proper quantity of potassium nitrate was put in a glass container and dissolved with addition of deionized water. Nickel metal powder was added to the solution so that the weight ratio of potassium in potassium nitrate to the total weight of the catalyst was 1%, and the mixture was stirred in an ultrasonic cleaner with ultrasonic waves for 15 minutes and thereafter dried on a hot plate for four hours. Thereafter the dried catalyst was moved onto a porcelain dish and baked in an electric furnace under conditions of an air atmosphere, a baking temperature of 350° C. and a baking time of four hours.

(Exemplary Catalyst 6) 1% Potassium-Added Nickel Particle Catalyst (C)

A proper quantity of potassium nitrate was put in a glass container and dissolved with addition; of deionized water. Nickel metallic particles were added to the solution so that the weight ratio of potassium in potassium nitrate to the total weight of the catalyst was 1%, and the mixture was stirred in an ultrasonic cleaner with ultrasonic waves for 15 minutes and thereafter dried on a hot plate for four hours. Thereafter the dried catalyst was moved onto a porcelain dish and baked in an electric furnace under conditions of an air atmosphere, a baking temperature of 500° C. and a baking time of four hours.

First to the sixth comparative examples producing carbon with the cobalt metal powder catalyst (a), the nickel metal powder catalyst (b) or the nickel metallic particle catalyst (c) shall now be described.

First Comparative Example

The cobalt metal powder catalyst (a) was charged by 0.1 g in the reaction tube 10 of the fixed bed reactor shown in FIG. 1 as the catalyst 12 and reduced under a hydrogen atmosphere at 400° C. for 1 hour. Thereafter, the reaction tube 10 was heated with the heating furnace 14, while a mixed gas containing nitrogen gas, carbon dioxide gas and hydrogen gas was supplied, for measuring the carbon amount produced from weight change before and after the reaction. In this reaction, nitrogen gas, carbon dioxide gas and hydrogen gas were in the ratios 1:3:6, the flow rate of the mixed gas was 800 ml/min., the reaction temperature was 520° C. and the reaction time (time with stable reaction conditions; this also applies to the following description)

was 12 hours. Because nitrogen remains unchanged before and after the reaction, it was employed as an internal standard reference material for obtaining the sample collection quantity in the comparative examples and examples.

As a result of weight measurement after the reaction, the quantity of the produced carbon was 0.71 g, the mean conversion ratio of carbon dioxide gas to carbon was 0.77%, the carbon deposition quantity was 528 g-carbon/kg-cat·h, and the weight ratio of the produced carbon to the catalyst (cobalt) was 7:1.

Next, the mixture of the cobalt metal powder catalyst (a) and carbon obtained in the aforementioned carbon production was charged by 0.4 g (0.05 g of cobalt and 0.35 g of carbon) in the reaction tube 10 of the fixed bed reactor shown in FIG. 1 as the catalyst 12, and the reaction tube 10 was heated with the heating furnace 14, while a mixed gas containing nitrogen gas, carbon dioxide gas and hydrogen gas was supplied, for measuring the carbon amount produced from weight change before and after the reaction. In this reaction, nitrogen gas, carbon dioxide gas and hydrogen gas were in the ratios 1:3:6, the flow rate of the mixed gas was 800 ml/min., the reaction temperature was 520° C. and the reaction time was 13.3 hours.

As a result of weight measurement after the reaction, the quantity of the produced carbon was 0.29 g, the mean conversion ratio of carbon dioxide gas to carbon was 0.28%, tie carbon deposition quantity was 436 g-carbon/kg-cat·h, and the weight ratio of the produced carbon to the catalyst (cobalt) was 13:1.

Second Comparative Example

The cobalt metal powder catalyst (a) was charged by 1.00 g in the reaction tube 10 of the fixed bed reactor shown in FIG. 1 as the catalyst 12 and reduced under a hydrogen atmosphere at 400° C. for 1 hour. Thereafter, the temperature of the reaction tube 10 was repetitively raised with the heating furnace 14 in the range of 250 to 620° C., while a mixed gas containing nitrogen gas, carbon dioxide gas and hydrogen gas was supplied, and the reacted gas was measured with the gas chromatograph 16 for determining the quantities of products. In this reaction, nitrogen gas, carbon dioxide gas and hydrogen gas were in the ratios 1:3:6, the flow rate of the mixed gas was 400 ml/min., and the programming rate was 2° C./min.

Figure 3A:
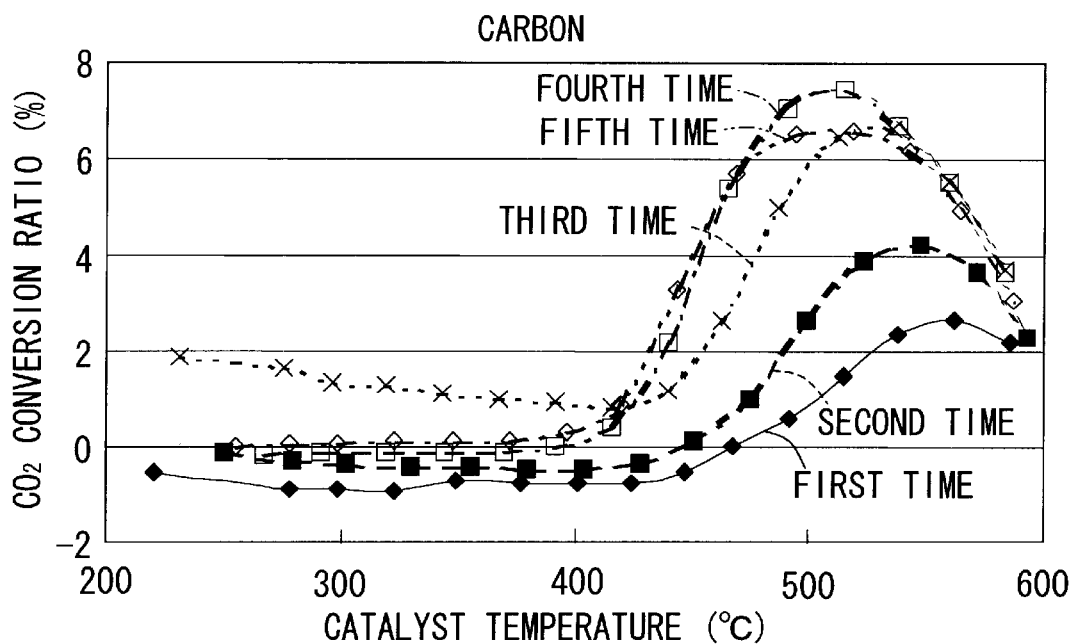
FIGS. 3A to 3C illustrate conversion ratios of carbon dioxide to carbon, methane and carbon monoxide obtained by repetitively raising the temperature five times in the second comparative example.
Figure 3B:
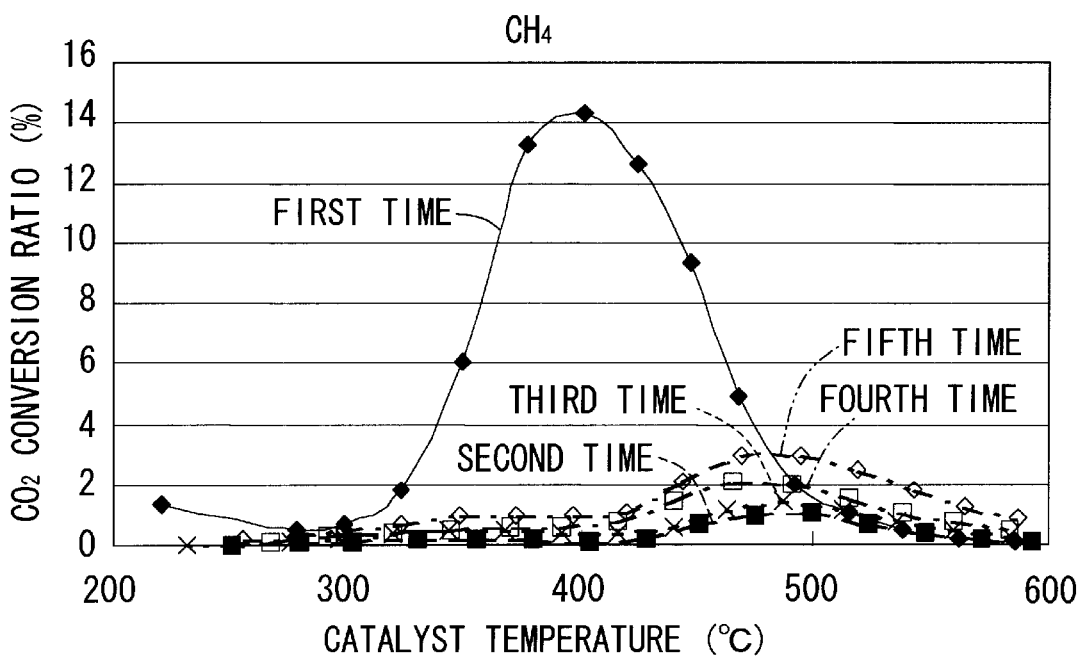
Figure 3C:
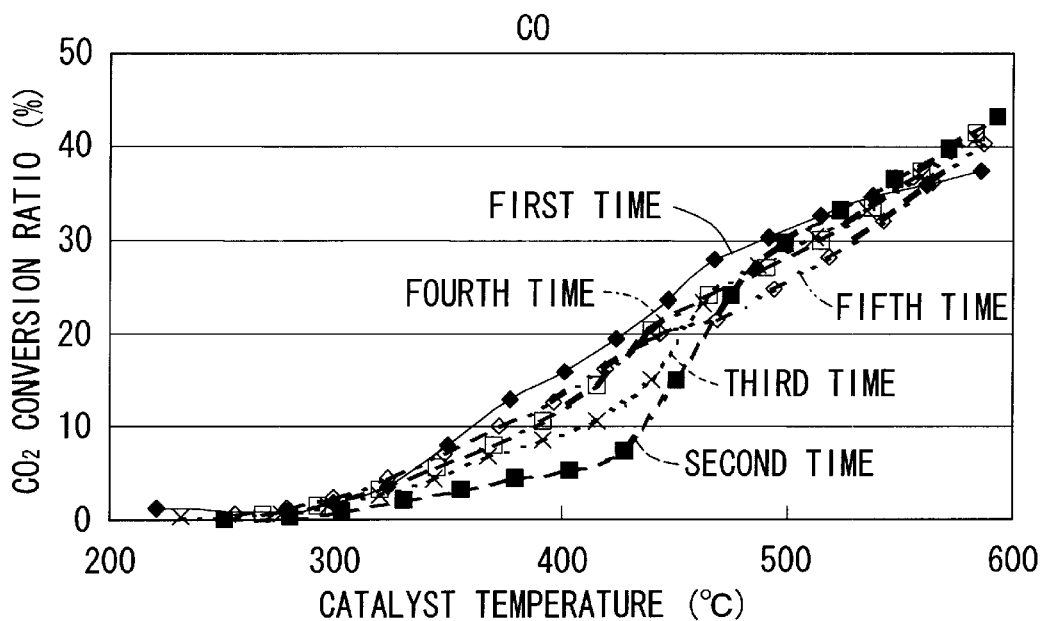
Figure 3D:
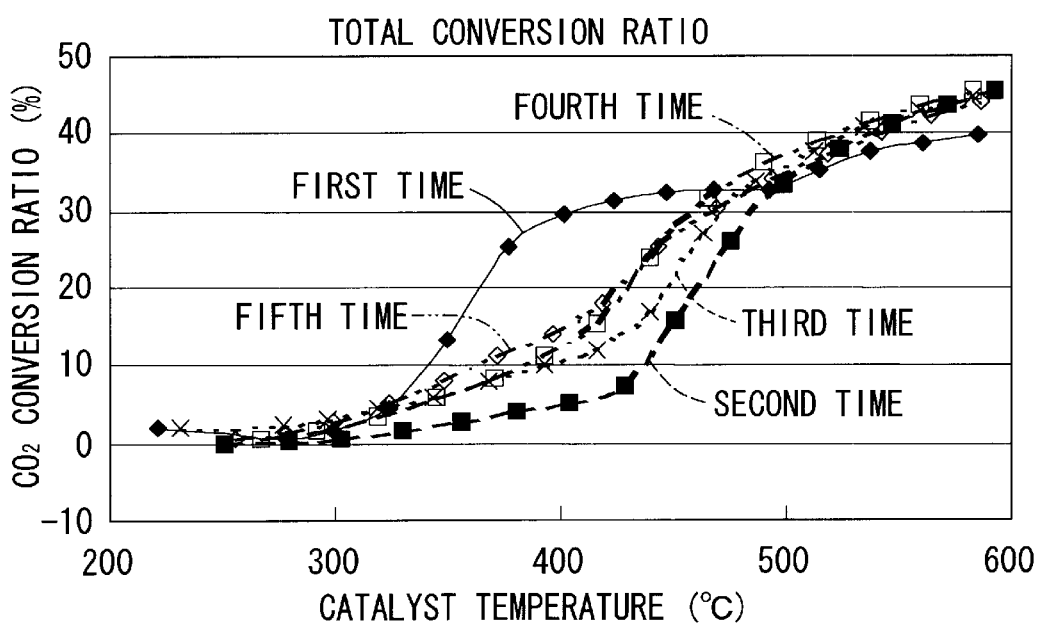
FIG. 3D illustrates total conversion ratios.

FIGS. 2A to 2E show conversion ratios of carbon dioxide to respective products obtained by repetitively raising the temperature five times in the second comparative example. FIGS. 3A to 3C illustrate conversion ratios of carbon dioxide to carbon, methane and carbon monoxide obtained by repetitively raising the temperature five times, and FIG. 3D illustrates total conversion ratios in the second comparative example. Referring to each of FIGS. 2A to 2E and 3A to 3D, the horizontal axis shows the catalyst temperatures (° C.) and the vertical axis shows the carbon dioxide conversion ratios (%).

The gas from the reaction tube 10 was analyzed at every temperature shown in FIGS. 2A to 2E and 3A to 3D. The quantities of carbon monoxide, carbon dioxide, methane and nitrogen were measured with the gas chromatograph 16 and the total quantity of detected carbon monoxide, carbon dioxide and methane was subtracted from the quantity of supplied carbon dioxide for obtaining the carbon content The total conversion ratios were obtained by subtracting the quantities of detected carbon dioxide from the quantity of supplied carbon dioxide.

From FIGS. 2A to 2E and 3A to 3D, the maximum conversion ratio of carbon dioxide gas to carbon was 6.8% with a peak of 510 to 520° C. The conversion ratio to carbon, which was increased up to the fourth temperature rise, was liable to decrease in the fifth temperature rise.

Third Comparative Example

The cobalt metal powder catalyst (a) was charged by 0.1006 g in the reaction tube 10 of the fixed bed reactor shown in FIG. 1 as the catalyst 12, reduced under a hydrogen atmosphere at 400° C. for 1 hour. Thereafter, the reaction tube 10 was heated with the heating furnace 14, while a mixed gas containing nitrogen gas, carbon dioxide gas and hydrogen gas was supplied, for measuring the carbon amount produced from weight change before and after the reaction. In this reaction, nitrogen gas, carbon dioxide gas and hydrogen gas were in the ratios 1:3:6, the flow rate of the mixed gas was 100 ml/min., the reaction temperature was 520° C., and the reaction time was 7.3 hours.

Figure 4:
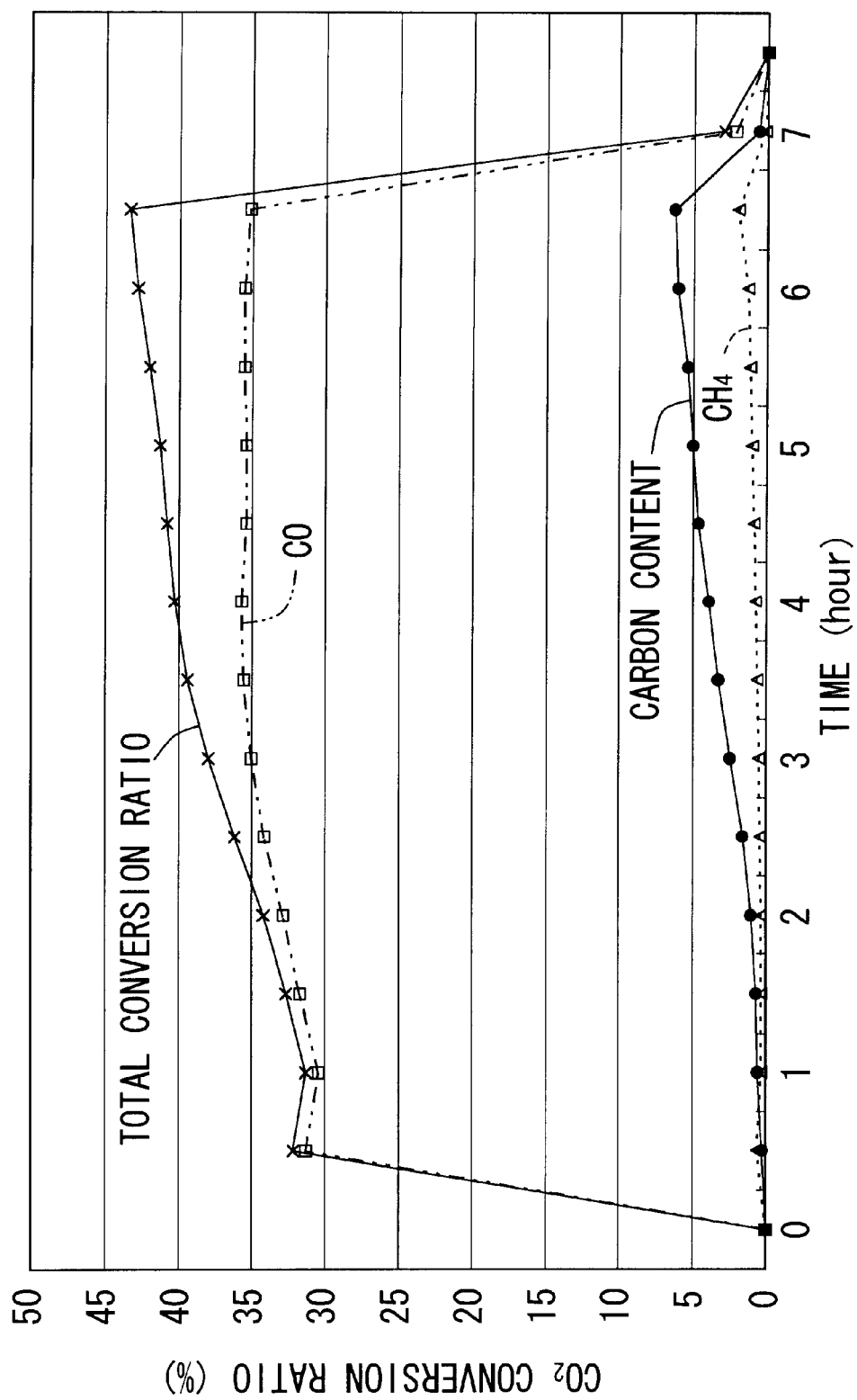
FIG. 4 illustrates reaction times and conversion ratios of carbon dioxide to respective products obtained by employing the cobalt metal powder catalyst (a) in the third comparative example.

FIG. 4 shows the reaction times and conversion ratios of carbon dioxide to respective products in the third comparative example. The horizontal axis shows the times (hour) and the vertical axis shows the carbon dioxide conversion ratios (%).

The gas from the reaction tube 10 was analyzed at every time shown in FIG. 4, and the conversion ratios to carbon monoxide, methane and carbon, and the total conversion ratio were obtained similarly to the second comparative example.

As a result of weight measurement after the reaction, the quantity of the produced carbon was 0.2945 g, the mean conversion ratio of carbon dioxide gas to carbon was 4.2%, and the carbon deposition quantity was 401 g-carbon/kg-cat·h.

Fourth Comparative Example

The cobalt metal powder catalyst (a) was charged by 0.3 to 5 g in the reaction tube 10 of the fixed bed reactor shown in FIG. 1 as the catalyst 12 and reduced under a hydrogen atmosphere at 400° C. for 1 hour. Thereafter, the reaction tube 10 was heated to 510° C. with the heating furnace 14, while a mixed gas containing nitrogen gas, carbon dioxide gas and hydrogen gas was supplied at a flow rate of 200 to 400 ml/min., for measuring the carbon amount produced from weight change before and after the reaction. In this reaction, nitrogen gas, carbon dioxide gas and hydrogen gas were in the ratios 1:3:6, and the reaction time was 7 to 13 hours.

Figure 5:
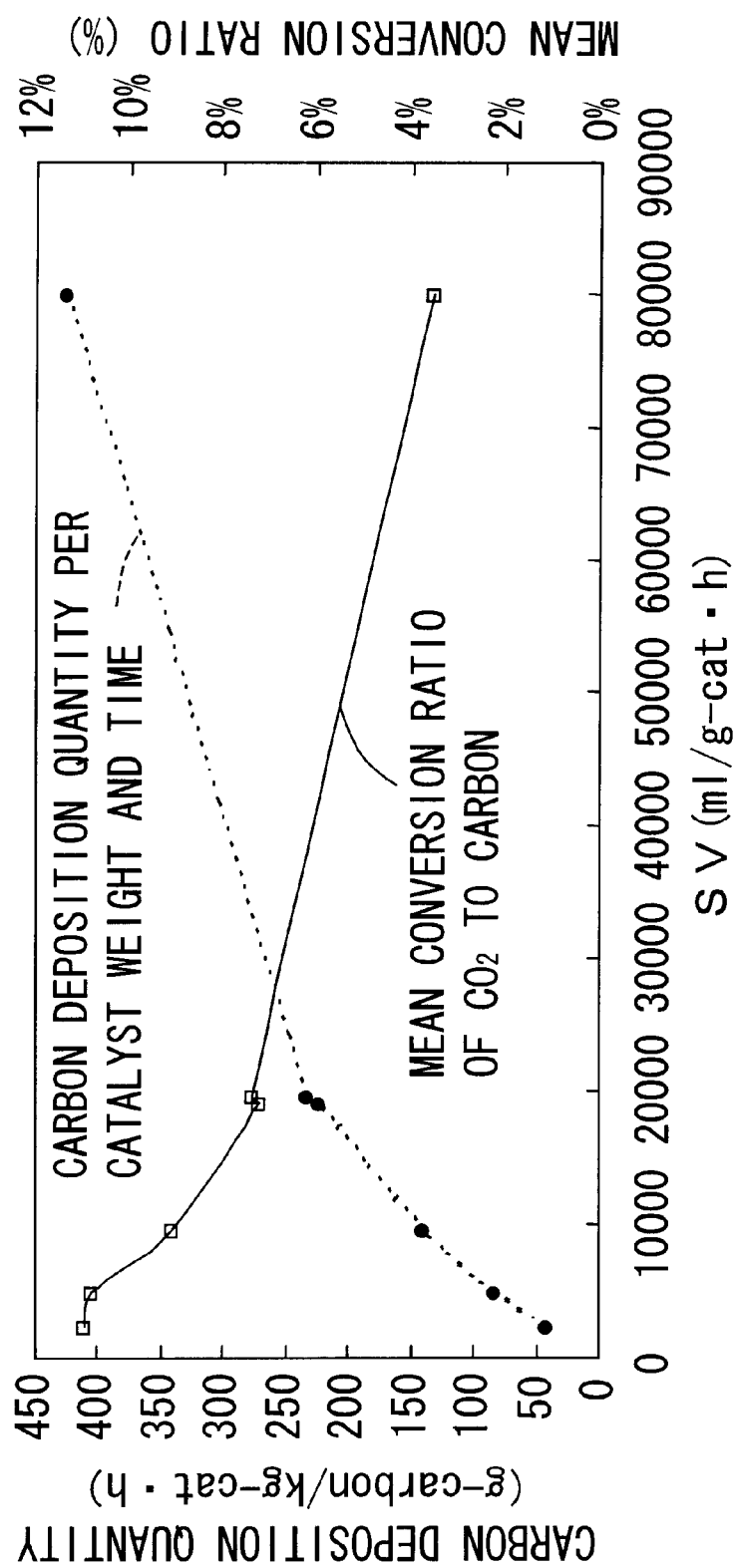
FIG. 5 illustrates carbon deposition quantities and mean conversion ratios obtained by employing the cobalt metal powder catalyst (a) and changing a space velocity in the fourth comparative example.

FIG. 5 shows the carbon deposition quantity and the mean conversion ratio in the case of changing the space velocity (SV: mixed gas flow rate per unit catalytic weight-unit time) in the fourth comparative example. The vertical axis shows the carbon deposition quantity (g-carbon/kg-cat·h) or the mean conversion ratio (%) and the horizontal axis shows the space velocity SV (ml/g-cat·h).

It is understood that the mean conversion ratio of carbon dioxide gas to carbon is reduced while the carbon deposition quantity per catalytic weight-time is increased when increasing the space velocity SV.

Fifth Comparative Example

The nickel metal powder catalyst (b) was charged by 0.1003 g in the reaction tube 10 of the fixed bed reactor shown in FIG. 1 as the catalyst 12, reduced under a hydrogen atmosphere at 400° C. for 1 hour. Thereafter, the reaction tube 10 was heated with the heating furnace 14, while a mixed gas containing nitrogen gas, carbon dioxide gas and hydrogen gas was supplied, for measuring the carbon amount produced from weight change before and after the reaction. In this reaction, nitrogen gas, carbon dioxide gas and hydrogen gas were in the ratios 1:3:6, the flow rate of the mixed gas was 100 ml/min., the reaction temperature was 520° C., and the reaction time was 10 hours.

Figure 6:
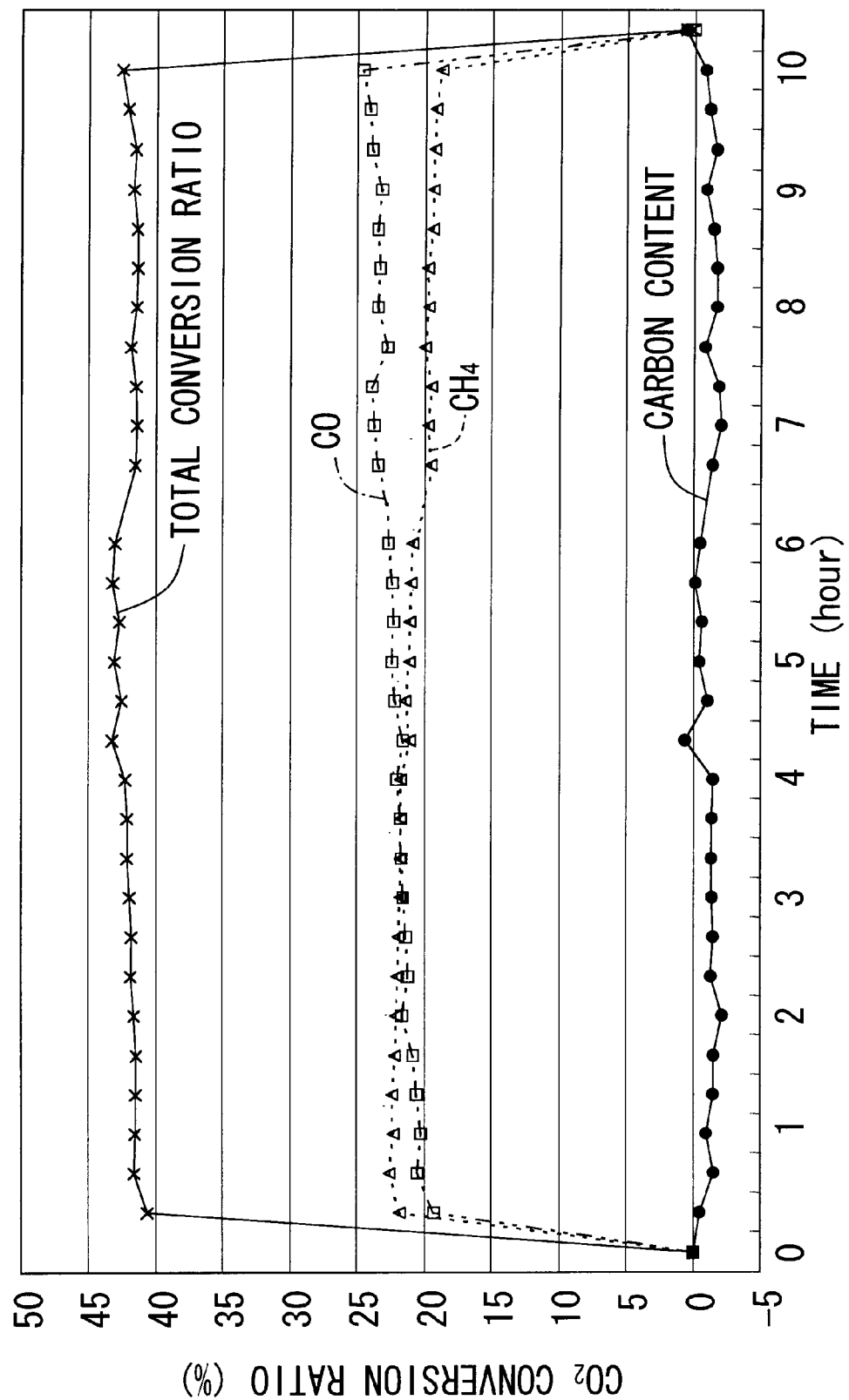
FIG. 6 illustrates reaction times and conversion ratios of carbon dioxide to respective products obtained by employing a nickel metal powder catalyst (b) in the fifth comparative example.

FIG. 6 shows the reaction times and the mean conversion ratios to respective products in the fifth comparative example. The horizontal axis shows the times (hour) and the vertical axis shows the carbon dioxide conversion ratios (%).

The gas from the reaction tube 10 was analyzed at every time shown in FIG. 6, and the conversion ratios to carbon monoxide, methane and carbon, and the total conversion ratio were obtained similarly to the second comparative example.

As a result of weight measurement after the reaction, no production of carbon was observed.

Sixth Comparative Example

The nickel metallic particle catalyst (c) was charged by 0.1001 g in the reaction tube 10 of the fixed bed reactor shown in FIG. 1 as the catalyst 12, reduced under a hydrogen atmosphere at 400° C. for 1 hour. Thereafter, the reaction tube 10 was heated with the heating furnace 14, while a mixed gas containing nitrogen gas, carbon dioxide gas and hydrogen gas was supplied, for measuring the carbon amount produced from weight change before and after the reaction. In this reaction, nitrogen gas, carbon dioxide gas and hydrogen gas were in the ratios 1:3:6, the flow rate of the mixed gas was 100 ml/min., the reaction temperature was 500° C., and the reaction time was 10 hours.

Figure 7:
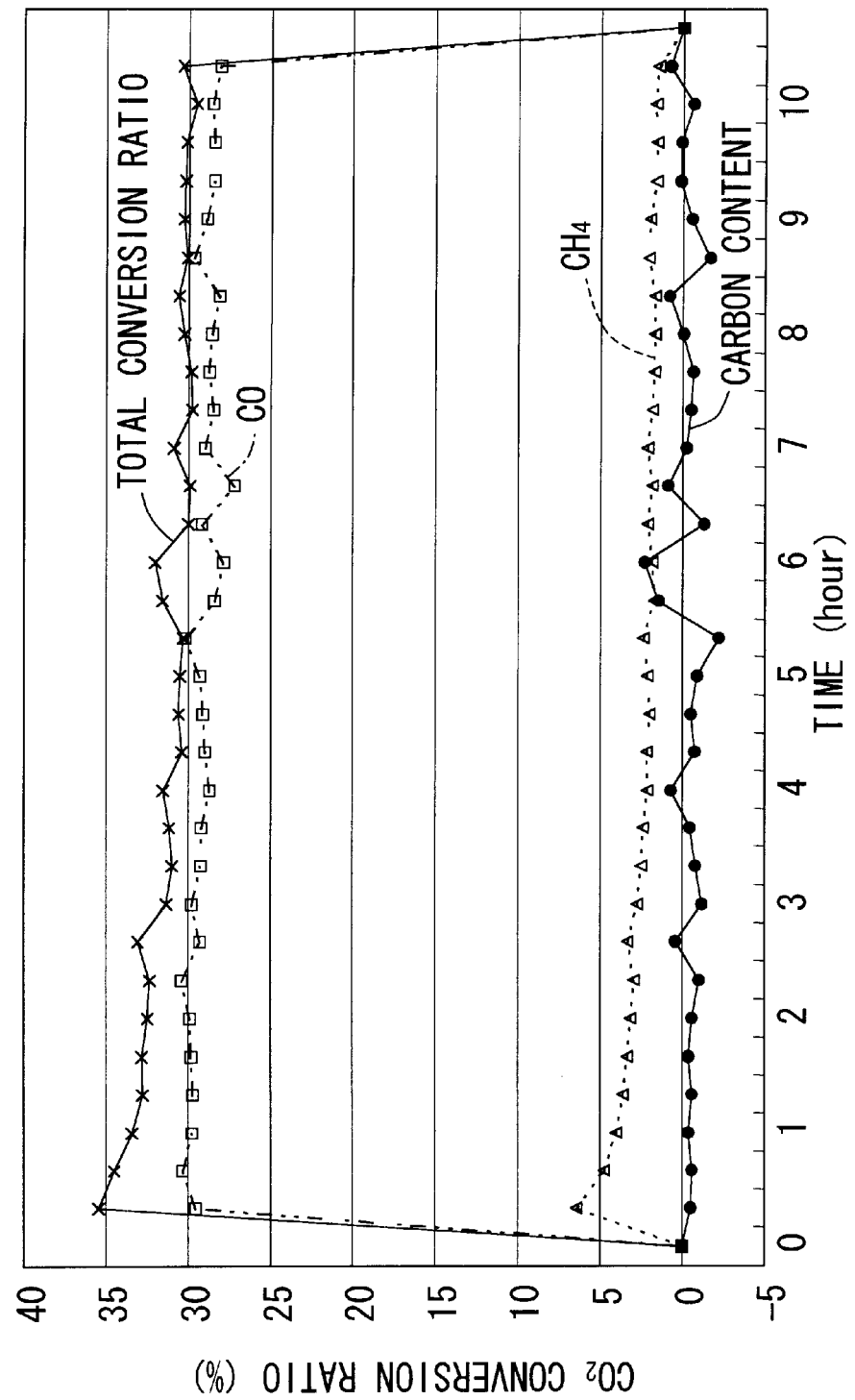
FIG. 7 illustrates reaction times and conversion ratios of carbon dioxide to respective products obtained by employing a nickel metallic particle catalyst (c) in the sixth comparative example.
Figure 8A:
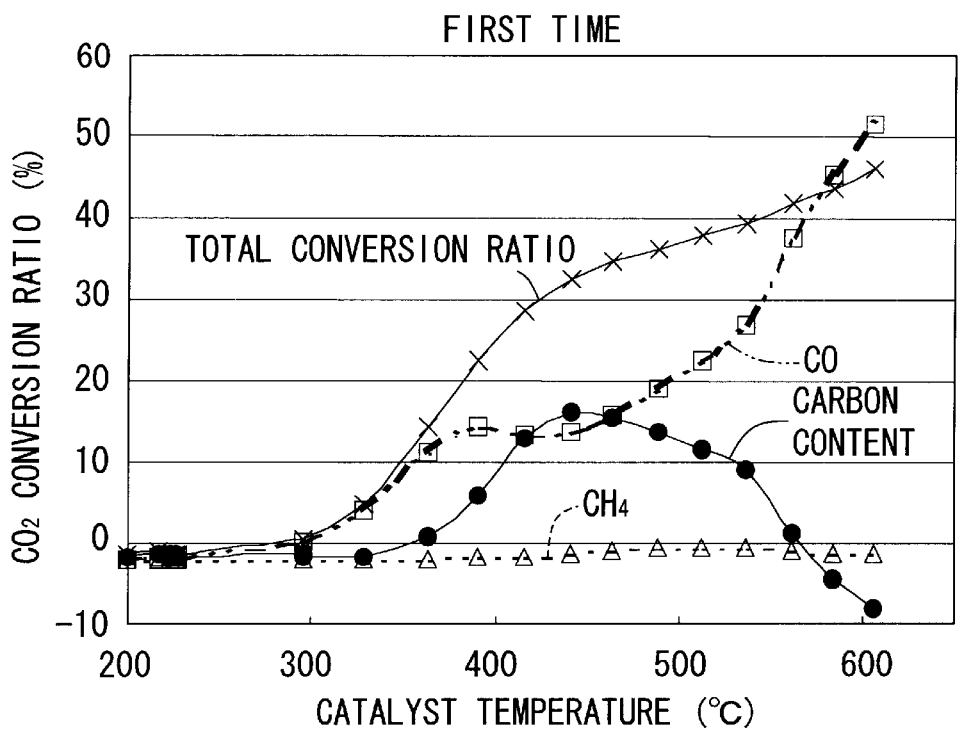
FIGS. 8A to 8E illustrate conversion ratios of carbon dioxide to respective products obtained by repetitively raising the temperature five times with a 1% potassium-added cobalt catalyst (A). in the first Example along with temperature programming times.
Figure 8B:
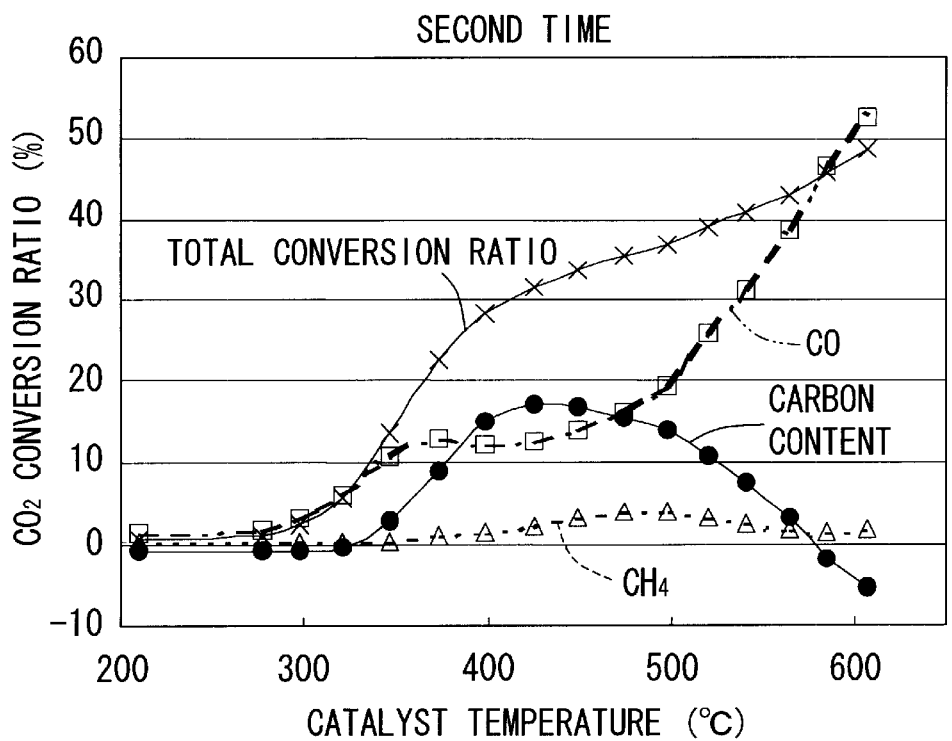
Figure 8C:
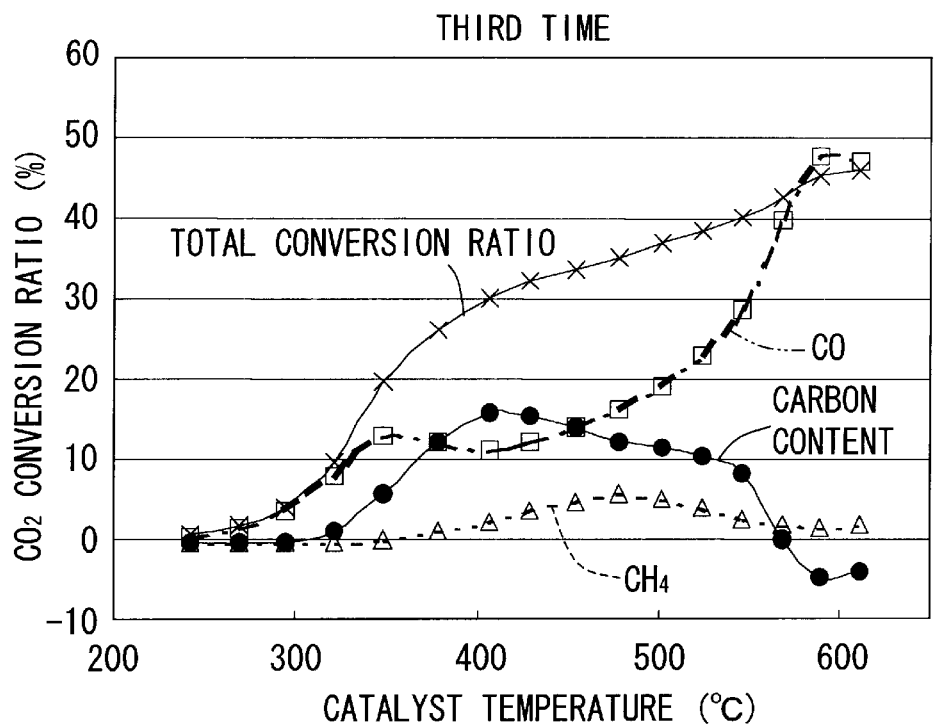
Figure 8D:
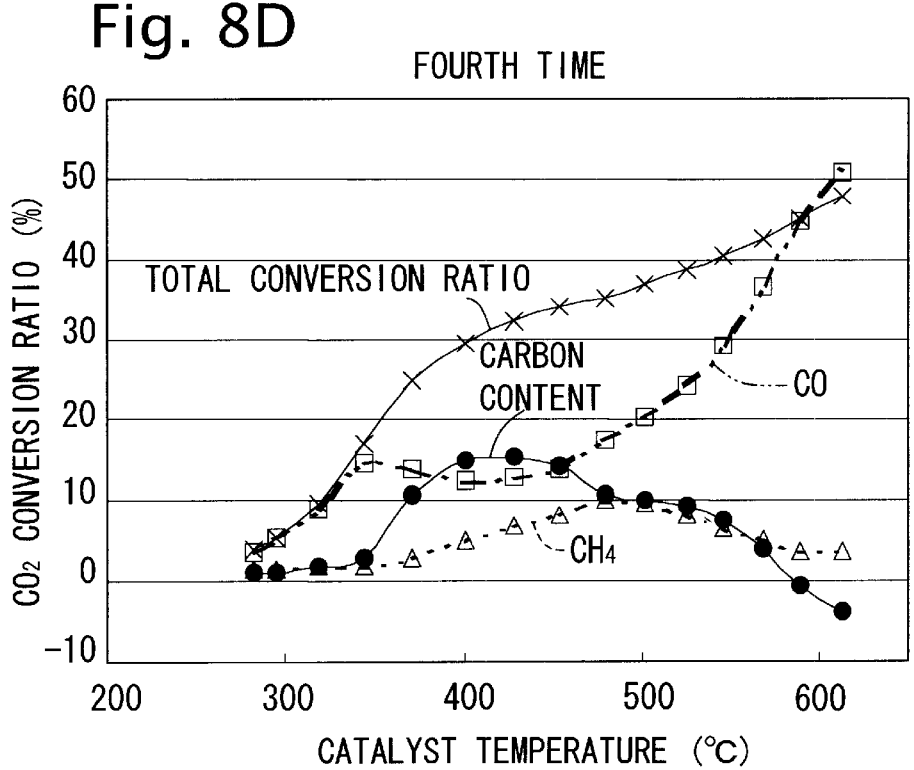
Figure 8E:
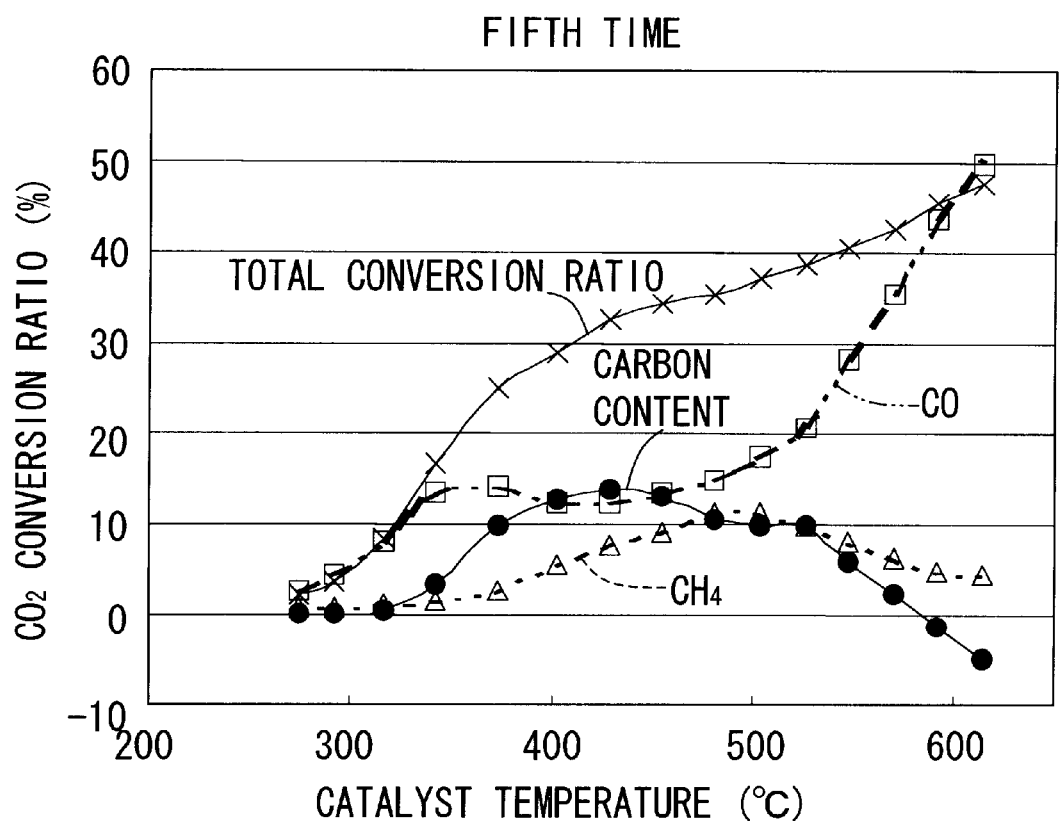

FIG. 7 shows the reaction times and the mean conversion ratios to respective products in the sixth comparative example. The horizontal axis shows the times (hour) and the vertical axis shows the carbon dioxide conversion ratios (%).

The gas from the reaction tube 10 was analyzed at every time shown in FIG. 7, and the conversion ratios to carbon monoxide, methane and carbon, and the total conversion ratio were obtained similarly to the second comparative example.

As a result of weight measurement after the reaction, no production of carbon was observed.

First to twelfth Examples producing carbon with the 1% potassium-added cobalt catalyst (A), the 1% potassium-added nickel catalyst (B) and the 1% potassium-added nickel particle catalyst (C) shall now be described.

FIRST EXAMPLE

The 1% potassium-added cobalt catalyst (A) was charged by 0.32 g in the reaction tube 10 of the fixed bed reactor shown in FIG. 1 as the catalyst 12 and reduced under a hydrogen atmosphere at 400° C. for 1 hour. After the reduction, the weight of the catalyst 12 was 0.25 g. This weight of the reduced catalyst 12 was calculated on the basis of a weight decrease ratio after reduction obtained in another reactor. This also applies to the remaining Examples. Thereafter, the temperature of the reaction tube 10 was repetitively raised with the heating furnace 14 in the range of 250 to 620° C., while a mixed gas containing nitrogen gas, carbon dioxide gas and hydrogen gas was supplied, and the reacted gas was measured with the gas chromatograph 16 for determining the quantities of products. In this reaction, nitrogen gas, carbon dioxide gas and hydrogen gas were in the ratios 1:3:6, the flow rate of the mixed gas was 100 ml/min., and the programming rate was 2° C./min.

Figure 9A:
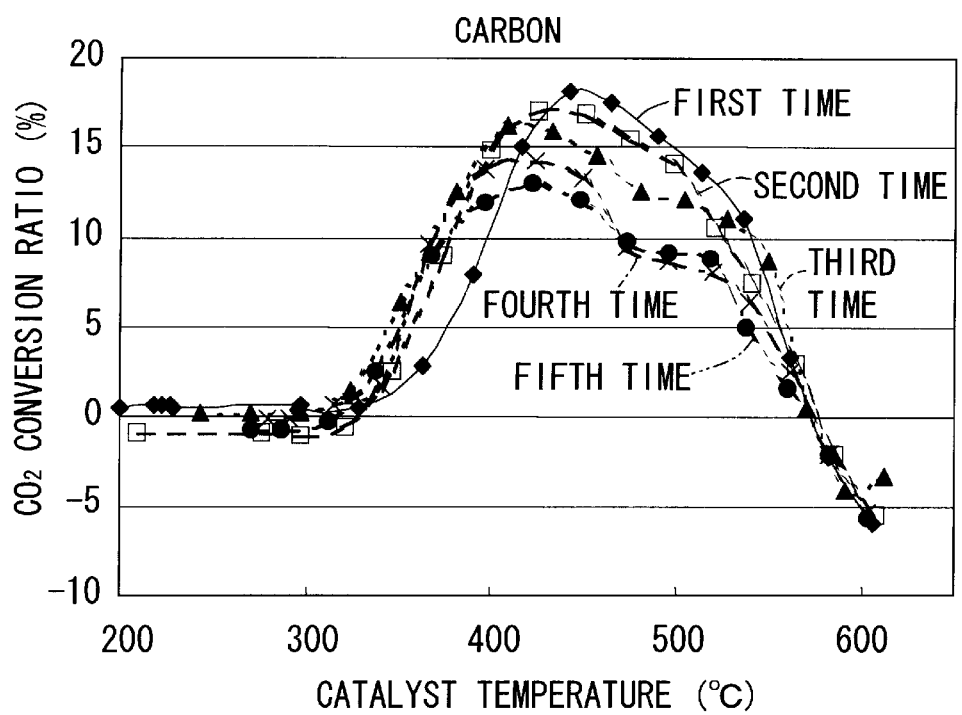
FIGS. 9A to 9C illustrate conversion ratios of carbon dioxide to carbon, methane and carbon monoxide obtained by repetitively raising the temperature five times in the first Example.
Figure 9B:
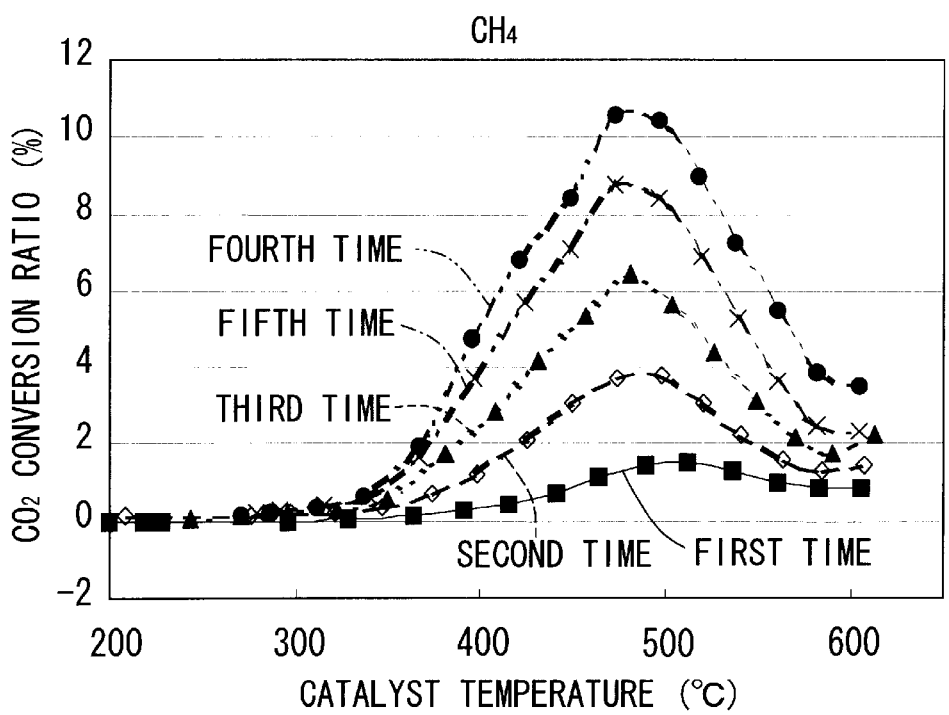
Figure 9C:
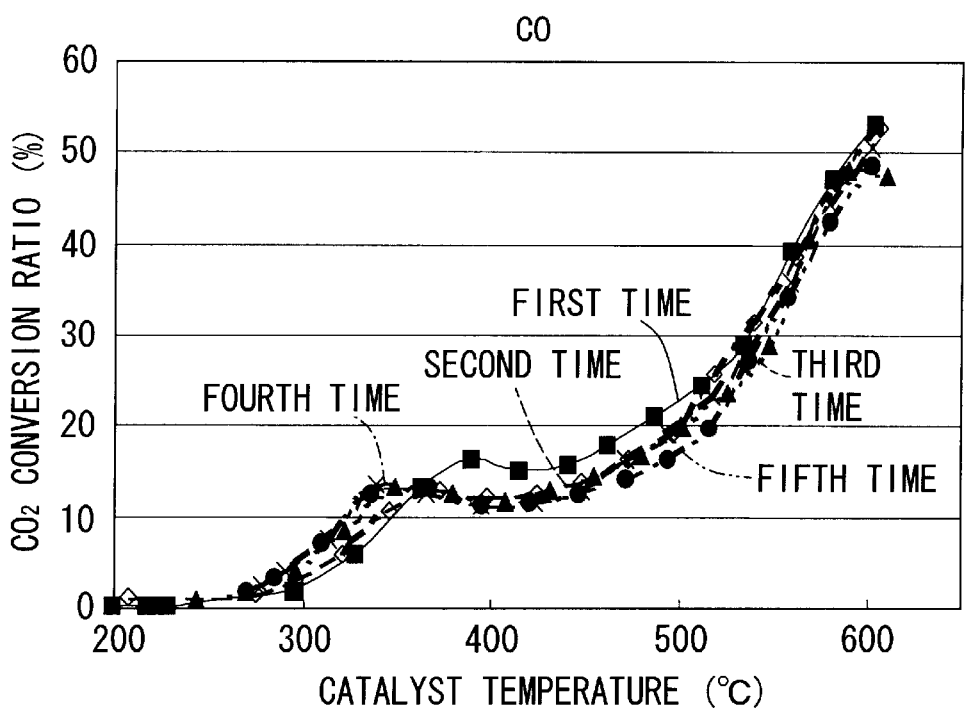
Figure 9D:
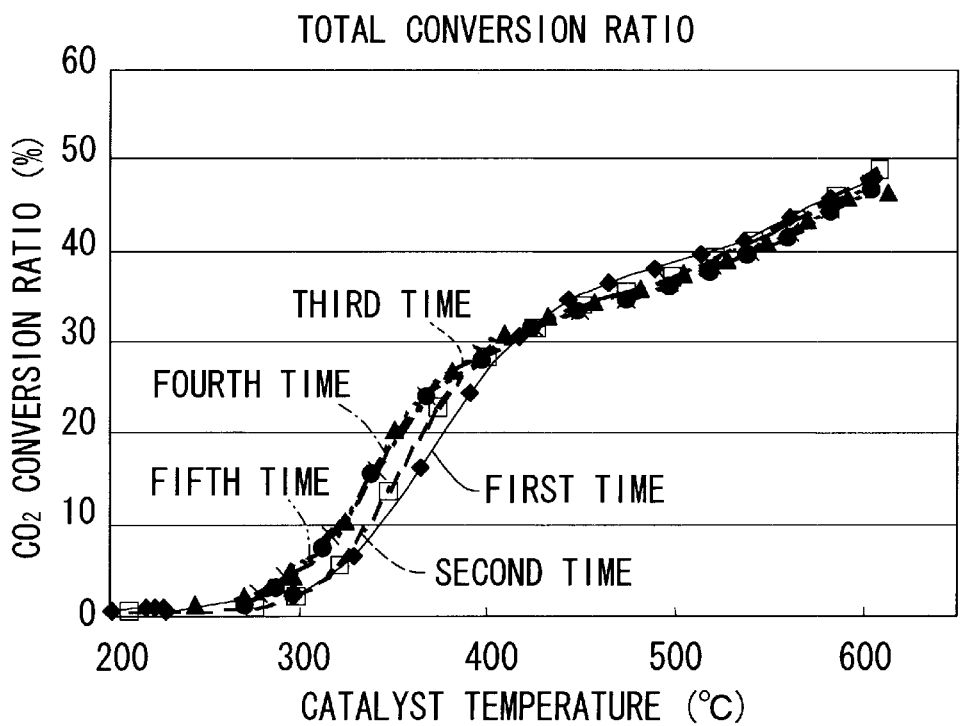
FIG. 9D illustrates total conversion ratios.
Figure 10A:
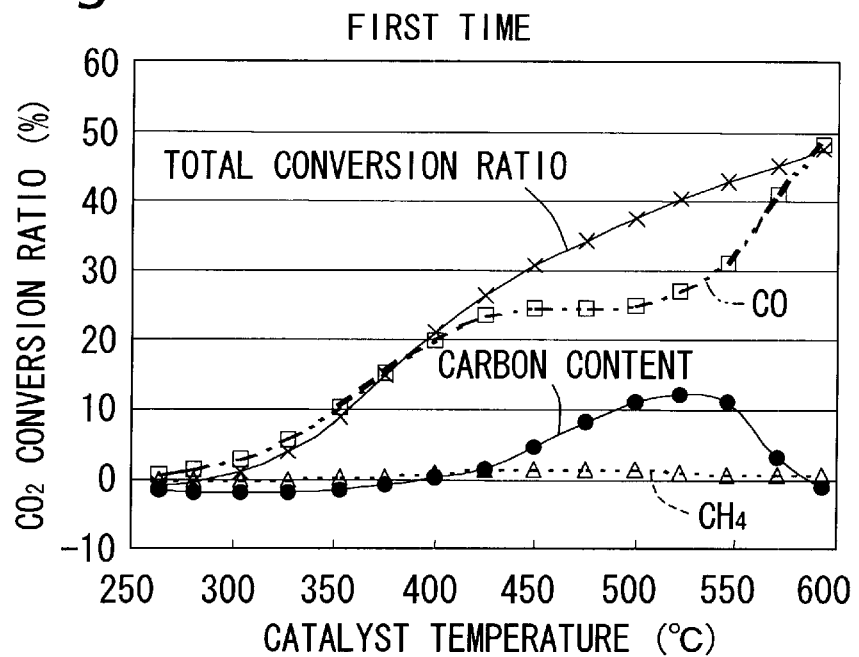
FIGS. 10A to 10E illustrate conversion ratios of carbon dioxide to respective products obtained by repetitively raising the temperature five times with a 1% potassium-added nickel catalyst (B) in the second Example along with temperature programming times.
Figure 10B:
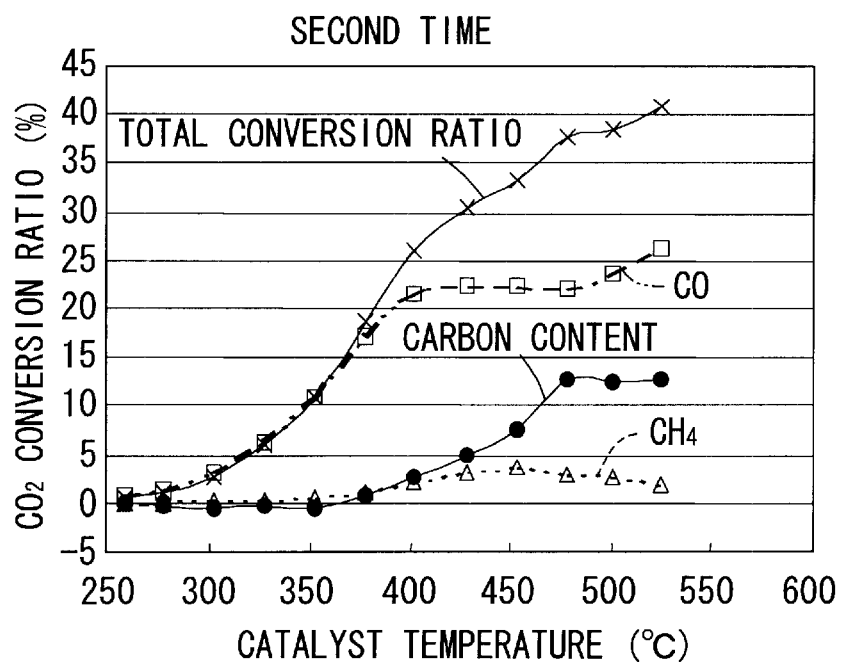
Figure 10C:
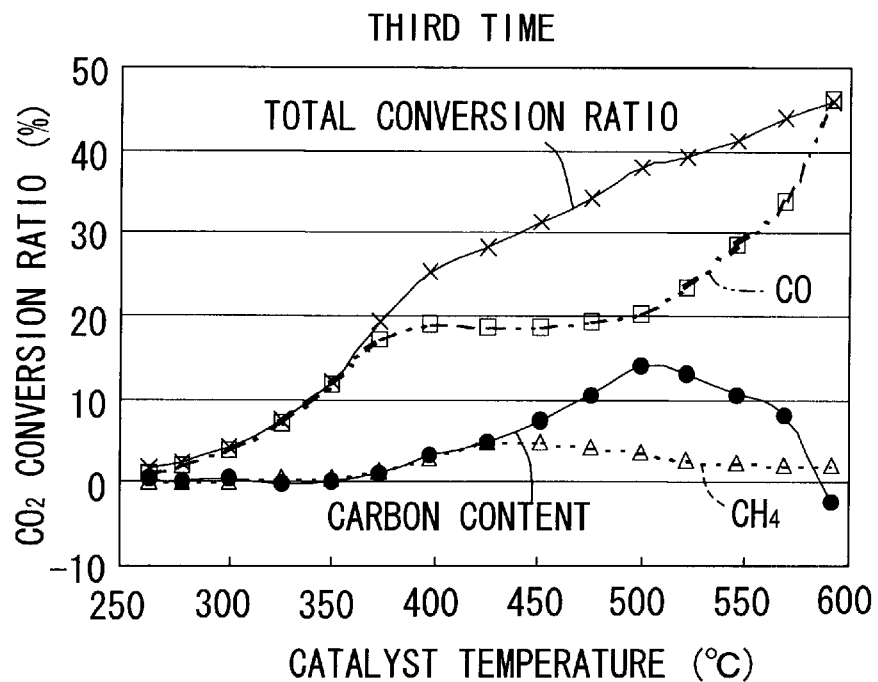
Figure 10D:
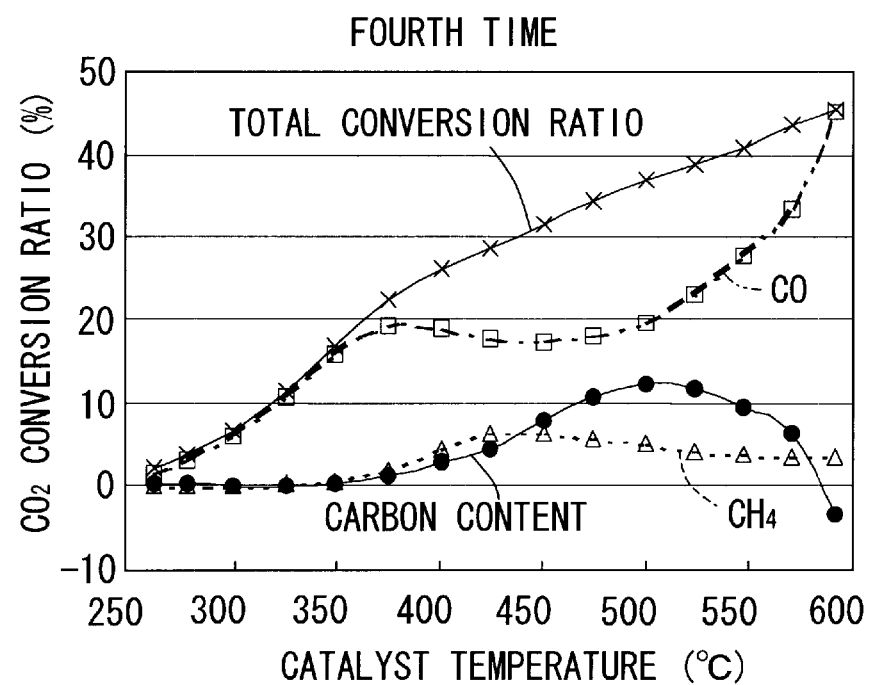
Figure 10E:
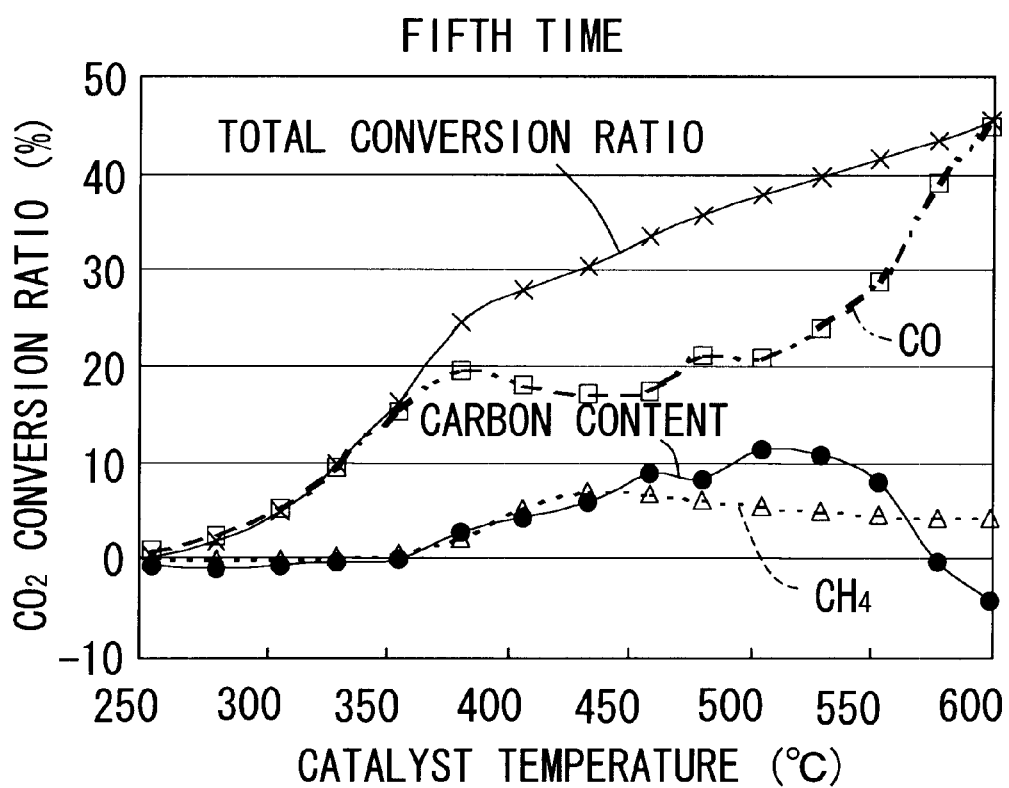

FIGS. 8A to 8E show conversion ratios of carbon dioxide to respective products obtained by repetitively raising the temperature five times in the first Example. FIGS. 9A to 9C illustrate conversion ratios of carbon dioxide to carbon, methane and carbon monoxide obtained by repetitively raising the temperature five times, and FIG. 9D illustrates total conversion ratio in the first Example. Referring to each of FIGS. 8A to 8E and 9A to 9D, the horizontal axis shows the catalyst temperatures (° C.) and the vertical axis shows the carbon dioxide conversion ratios (%).

The gas from the reaction tube 10 was analyzed at every temperature shown in FIGS. 8A to 8E and 9A to 9D. The conversion ratios of carbon dioxide to carbon monoxide, methane and carbon, and the total conversion ratio were obtained similarly to the second comparative example.

From FIGS. 8A to 8E and 9A to 9D, the maximum conversion ratio of carbon dioxide gas to carbon was 18.0% with a peak of 410 to 430° C.

SECOND EXAMPLE

The 1% potassium-added nickel catalyst (B) was charged by 0.26 g in the reaction tube 10 of the fixed bed reactor shown in FIG. 1 as the catalyst 12 and reduced under a hydrogen atmosphere at 400° C. for 1 hour. After the reduction, the weight of the catalyst 12 was 0.25 g. Thereafter, the temperature of the reaction tube 10 was repetitively raised with the heating furnace 14 in the range of 250 to 620° C., while a mixed gas containing nitrogen gas, carbon dioxide gas and hydrogen gas was supplied, and the reacted gas was measured with the gas chromatograph 16 for determining the quantities of products. In this reaction, nitrogen gas, carbon dioxide gas and hydrogen gas were in the ratios 1:3:6, the flow rate of the mixed gas was 100 ml/min., and the programming rate was 2° C./min.

Figure 11A:
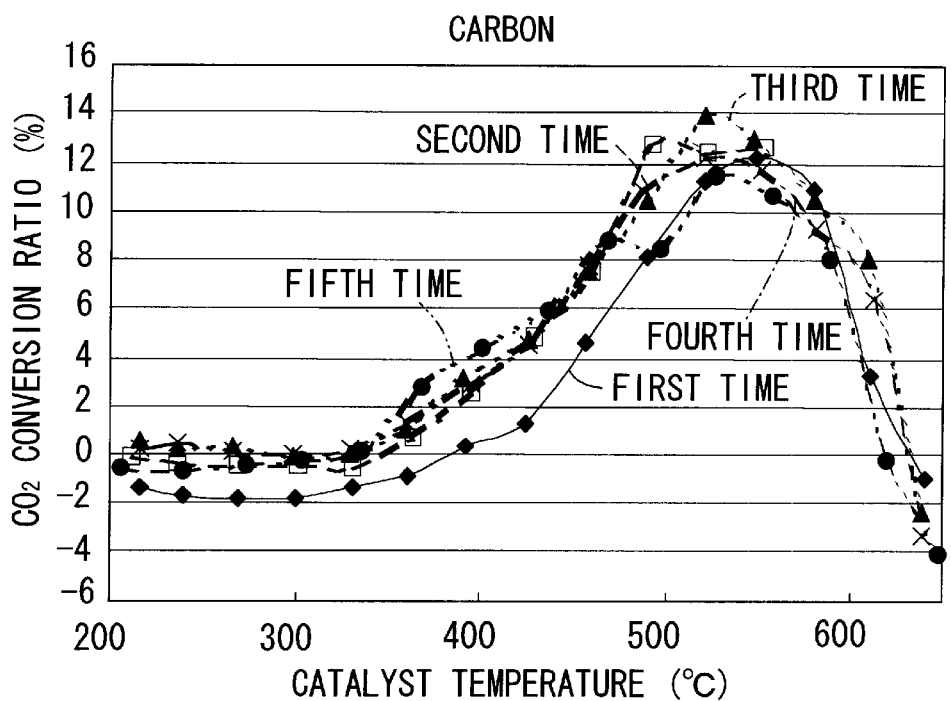
FIGS. 11A to 11C illustrate conversion ratios of carbon dioxide to carbon, methane and carbon monoxide obtained by repetitively raising the temperature five times in the second Example.
Figure 11B:
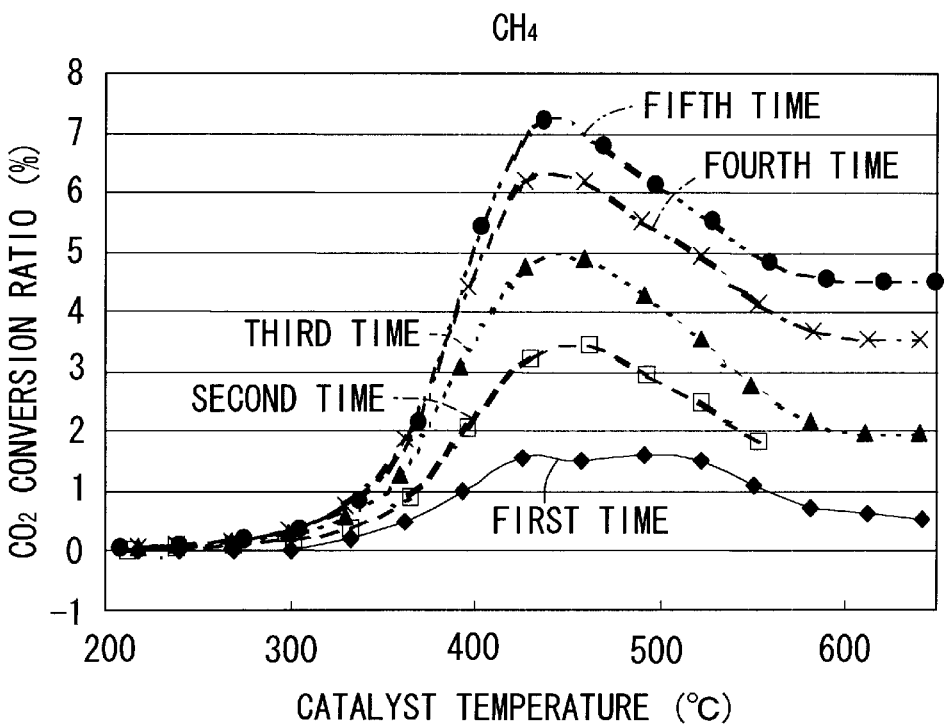
Figure 11C:
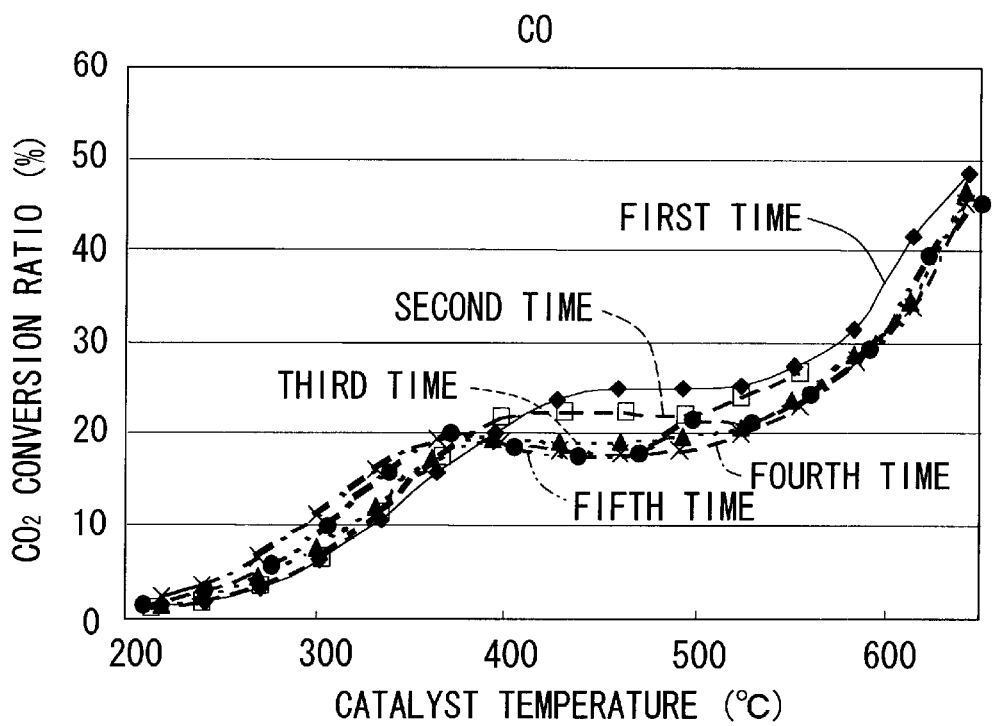
Figure 11D:
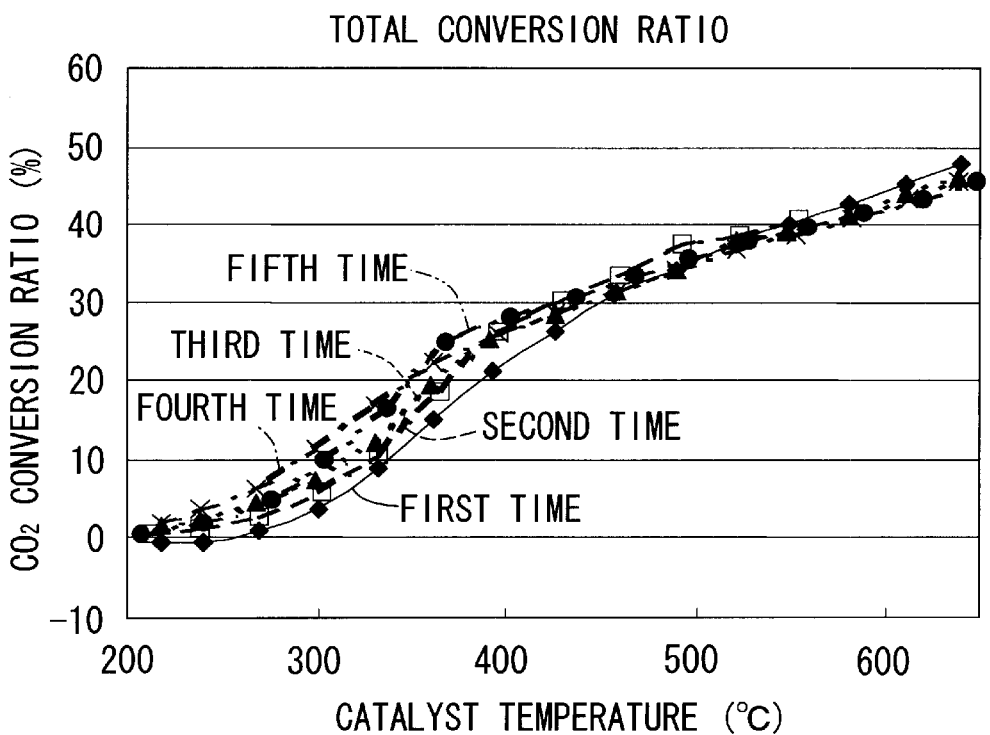
FIG. 11(D) illustrates total conversion ratios.

FIGS. 10A to 10E show conversion ratios of carbon dioxide to respective products obtained by repetitively raising the temperature five times in the second Example. FIGS. 11A to 11C illustrate conversion ratios of carbon dioxide to carbon, methane and carbon monoxide obtained by repetitively raising the temperature five times, and FIG. 11D illustrates total conversion ratio, in the second Example. Referring to each of FIGS. 10A to 10E and 11A to 11D, the horizontal axis shows the catalyst temperatures (° C.) and the vertical axis shows the carbon dioxide conversion ratios (%).

The gas from the reaction tube 10 was analyzed at every temperature shown in FIGS. 10A to 11E and 11A to 11D, and the conversion ratios of carbon dioxide to carbon monoxide, methane and carbon, and the total conversion ratios were obtained similarly to the second comparative example.

From FIGS. 10A to 10E and 11A to 11D, the maximum conversion ratio of carbon dioxide gas to carbon was 14.0% with a peak of 480 to 510° C.

THIRD EXAMPLE

The 1% potassium-added cobalt catalyst (A) was charged by 0.64 g in the reaction tube 10 of the fixed bed reactor shown in FIG. 1 as the catalyst 12 and reduced under a hydrogen atmosphere at 400° C. for 1 hour. After the reduction, the weight of the catalyst 12 was 0.50 g. Thereafter, the temperature of the reaction tube 10 was raised with the heating furnace 14, while a mixed gas containing nitrogen gas, carbon dioxide gas and hydrogen gas was supplied, for measuring the carbon amount produced from weight change before and after the reaction. In this reaction, nitrogen gas, carbon dioxide gas and hydrogen gas were in the ratios 1:3:6, the flow rate of the mixed gas was 100 ml/min., the reaction temperature was 520° C., and the reaction time was 10 hours.

Figure 12:
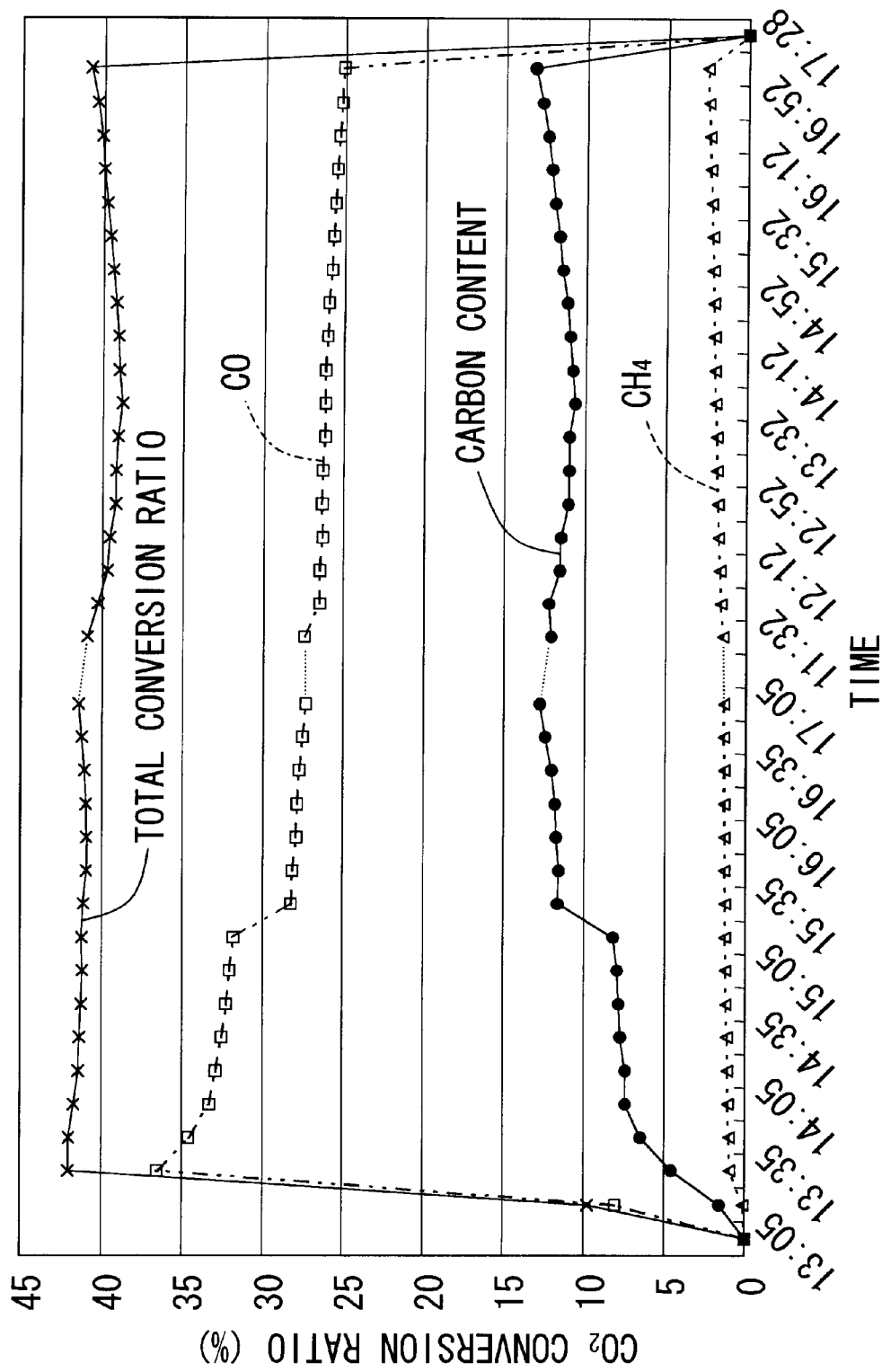
FIG. 12 illustrates reaction times and conversion ratios of carbon dioxide to respective products obtained by employing the 1% potassium-added cobalt metal powder catalyst (A) in the third Example.

FIG. 12 shows the reaction times and the conversion ratios of carbon dioxide to respective products in the third Example. The horizontal axis shows the times and the vertical axis shows the carbon dioxide conversion ratios (%).

The gas from the reaction tube 10 was analyzed at every temperature shown in FIG. 12, and the conversion ratios to carbon monoxide, methane and carbon, and the total conversion ratios were obtained similarly to second comparative example.

As a result of weight measurement after the reaction, the quantity of the produced carbon was 1.56 g, the mean conversion ratio of carbon dioxide gas to carbon was 16.2%, and the carbon deposition quantity was 312 g-carbon/kg-cat·h.

FOURTH EXAMPLE

The 1% potassium-added cobalt catalyst (A) was charged by 0.64 g in the reaction tube 10 of the fixed bed reactor shown in FIG. 1 as the catalyst 12 and reduced under a hydrogen atmosphere at 400° C. for 1 hour. After the reduction, the weight of the catalyst 12 was 0.50 g. Thereafter, the temperature of the reaction tube 10 was raised with the heating furnace 14, while a mixed gas containing nitrogen gas, carbon dioxide gas and hydrogen gas was supplied, for measuring the carbon amount produced from weight change before and after the reaction. In this reaction, nitrogen gas, carbon dioxide gas and hydrogen gas were in the ratios 1:3:6, the flow rate of the mixed gas was 800 ml/min., the reaction temperature was 520° C., and the reaction time was 40 minutes.

Figure 13:
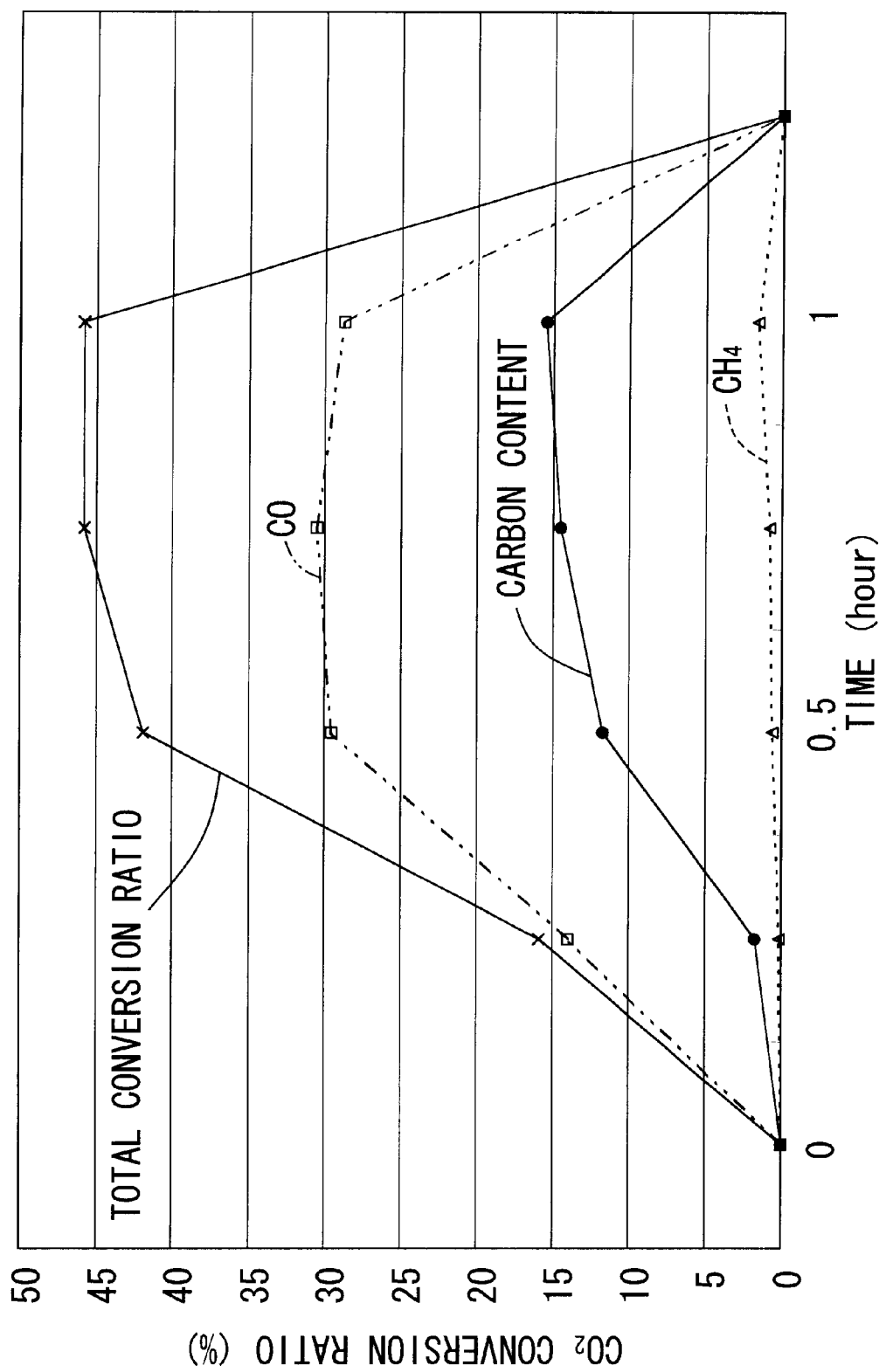
FIG. 13 illustrates reaction times and conversion ratios of carbon dioxide to respective products obtained by employing the 1% potassium-added cobalt metal powder catalyst (A) under other conditions in the fourth Example.

FIG. 13 shows the reaction times and the conversion ratios of carbon dioxide to respective products in the fourth Example. The horizontal axis shows the times (hour) and the vertical axis shows the carbon dioxide conversion ratios (%).

The gas from the reaction tube 10 was analyzed at every temperature shown in FIG. 13, and the conversion ratios to carbon monoxide, methane and carbon, and the total conversion ratios were obtained similarly to the second comparative example.

As a result of weight measurement after the reaction, the quantity of the produced carbon was 0.71 g, the mean conversion ratio of carbon dioxide gas to carbon was 13.8%, and the carbon deposition quantity was 1065 g-carbon/kg-cat·h.

FIFTH EXAMPLE

The 1% potassium-added cobalt catalyst (A) was charged by 0.38 g in the reaction tube 10 of the fixed bed reactor shown in FIG. 1 as the catalyst 12 and reduced under a hydrogen atmosphere at 400° C. for 1 hour. After the reduction, the weight of the catalyst 12 was 0.30 g. Thereafter, the temperature of the reaction tube 10 was raised with the heating furnace 14, while a mixed gas containing nitrogen gas, carbon dioxide gas and hydrogen gas was supplied, for measuring the carbon amount produced from weight change before and after the reaction. In this reaction, nitrogen gas, carbon dioxide gas and hydrogen gas were in the ratios 1:3:6, the flow rate of the mixed gas was 400 ml/min., the reaction temperature was 520° C., and the reaction time was 4.5 hours.

Figure 14:
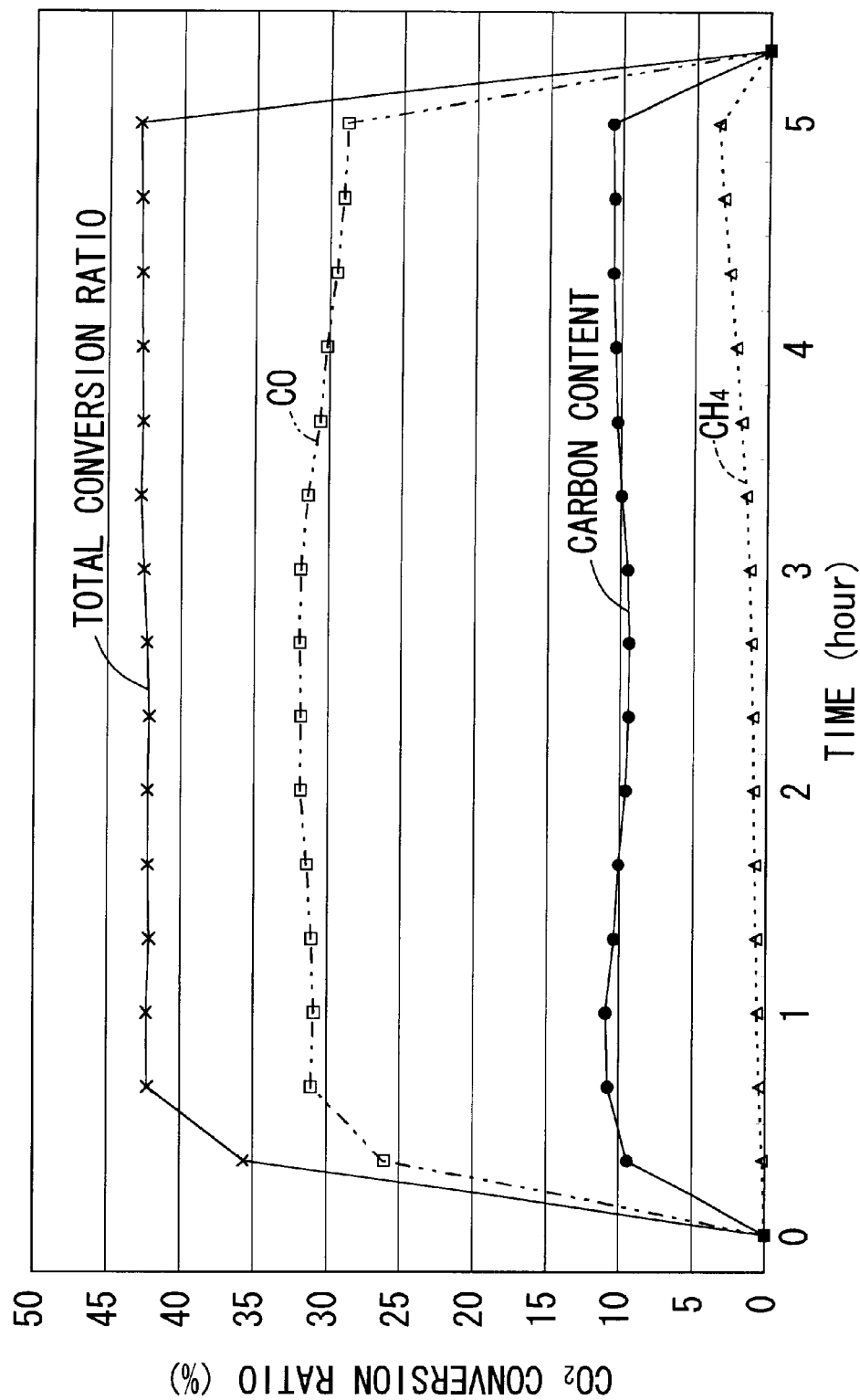
FIG. 14 illustrates reaction times and conversion ratios of carbon dioxide to respective products obtained by employing the 1% potassium-added cobalt metal powder catalyst (A) under further conditions in the fifth Example.

FIG. 14 shows the reaction times and the conversion ratios of carbon dioxide to respective products in the fifth Example. The horizontal axis shows the times (hour) and the vertical axis shows the carbon dioxide conversion ratios (%).

The gas from the reaction tube 10 was analyzed at every temperature shown in FIG. 14, and the conversion ratios to carbon monoxide, methane and carbon, and the total conversion ratios were obtained similarly to second comparative example.

As a result of weight measurement after the reaction, the quantity of the produced carbon was 1.75 g, the mean conversion ratio of carbon dioxide gas to carbon was 10.5%, and the carbon deposition quantity was 1356 g-carbon/k-cat·h.

SIXTH EXAMPLE

The 1% potassium-added cobalt catalyst (A) was charged by 0.0158 g in the reaction tube 10 of the fixed bed reactor shown in FIG. 1 as the catalyst 12 and reduced under a hydrogen atmosphere at 400° C. for 1 hour. After the reduction, the weight of the catalyst 12 was 0.0123 g. Thereafter, the temperature of the reaction tube 10 was raised with the heating furnace 14, while a mixed gas containing nitrogen gas, carbon dioxide gas and hydrogen gas was supplied, for measuring the carbon amount produced from weight change before and after the reaction. In this reaction, nitrogen gas, carbon dioxide gas and hydrogen gas were in the ratios 1:4:8, the flow rate of the mixed gas was 65 ml/min., the reaction temperature was 520° C., and the reaction time was 5 hours.

Figure 15:
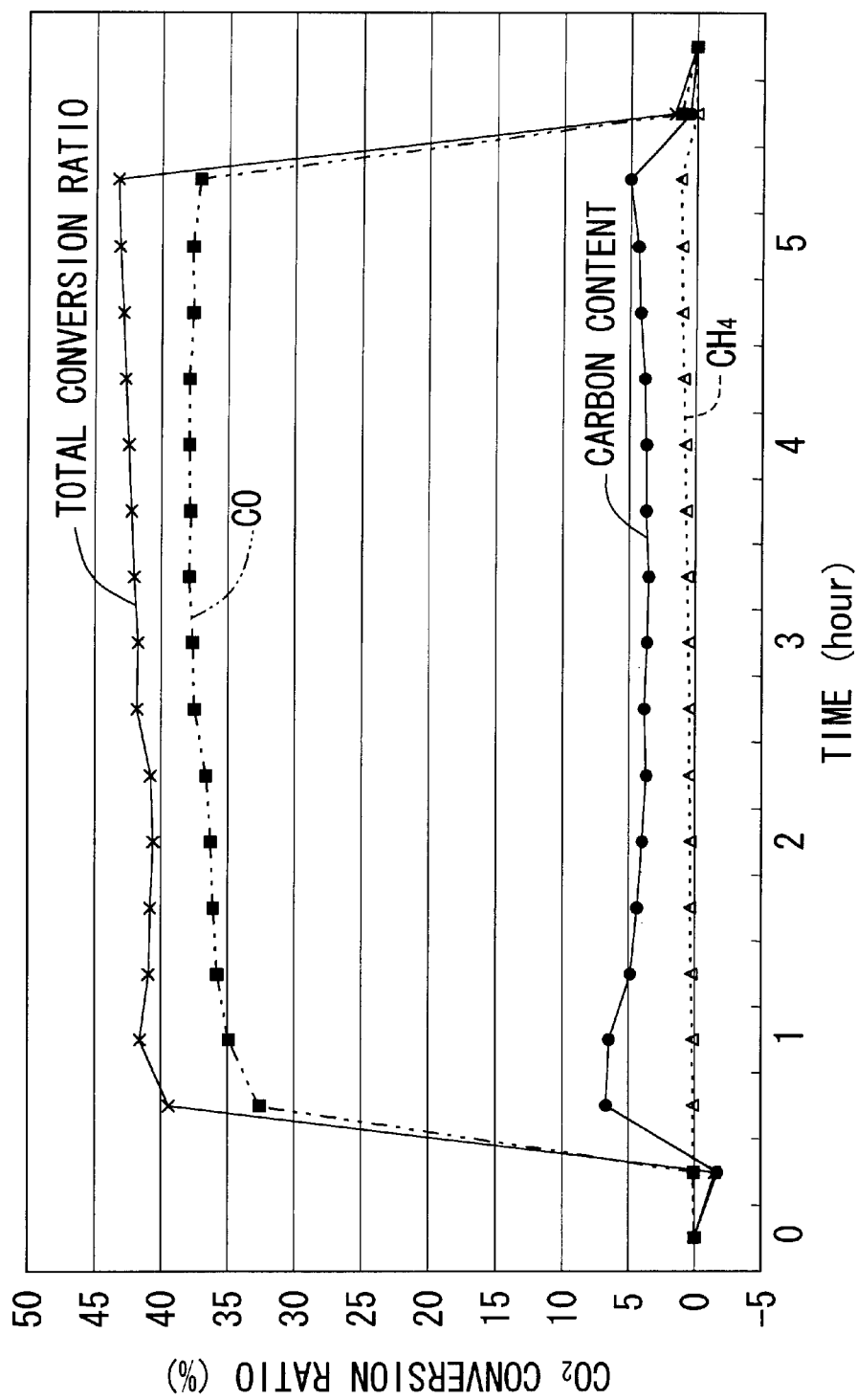
FIG. 15 illustrates reaction times and conversion ratios of carbon dioxide to respective products obtained by employing the 1% potassium-added cobalt metal powder catalyst (A) under further conditions in the sixth Example.

FIG. 15 shows the reaction times and the conversion ratios of carbon dioxide to respective products in the sixth Example. The horizontal axis shows the times (hour) and the vertical axis shows the carbon dioxide conversion ratios (%).

The gas from the reaction tube 10 was analyzed at every temperature shown in FIG. 15, and the conversion ratios to carbon monoxide, methane and carbon, and the total conversion ratios were obtained similarly to second comparative example.

As a result of weight measurement after the reaction, the quantity of the produced carbon was 0.1647 g, the mean conversion ratio of carbon dioxide gas to carbon was 5.1%, and the carbon deposition quantity was 2678 g-carbon/kg-cat·h.

SEVENTH EXAMPLE

The 1% potassium-added cobalt catalyst (A) was charged by 0.1270 g in the reaction tube 10 of the fixed bed reactor shown in FIG. 1 as the catalyst 12 and reduced under a hydrogen atmosphere at 400° C. for 1 hour. After the reduction, the weight of the catalyst 12 was 0.0992 g. Thereafter, the temperature of the reaction tube 10 was raised with the heating furnace 14, while a mixed gas containing nitrogen gas, carbon dioxide gas and hydrogen gas was supplied, for measuring the carbon amount produced from weight change before and after the reaction. In this reaction, nitrogen gas, carbon dioxide gas and hydrogen gas were in the ratios 1:3:6, the flow rate of the mixed gas was 100 ml/min., the reaction temperature was 410° C., and the reaction time was 1 hour 13 minutes.

As a result of weight measurement after the reaction, the quantity of the produced carbon was 0.2098 g, the mean conversion ratio of carbon dioxide gas to carbon was 17.9%, and the carbon deposition quantity was 1738 g-carbon/kg-cat·h.

EIGHTH EXAMPLE

The 1% potassium-added cobalt catalyst (A) was charged by 0.0112 g in the reaction tube 10 of the fixed bed reactor shown in FIG. 1 as the catalyst 12 and reduced under a hydrogen atmosphere at 400° C. for 1 hour. After the reduction, the weight of the catalyst 12 was 0.0087 g. Thereafter, the temperature of the reaction tube 10 was raised with the heating furnace 14, while a mixed gas containing nitrogen gas, carbon dioxide gas and hydrogen gas was supplied, for measuring the carbon amount produced from weight change before and after the reaction. In this reaction, nitrogen gas, carbon dioxide gas and hydrogen gas were in the ratios 1:3:6, the flow rate of the mixed gas was 100 ml/min., the reaction temperature was 410° C., and the reaction time was 5 hours.

Figure 16:
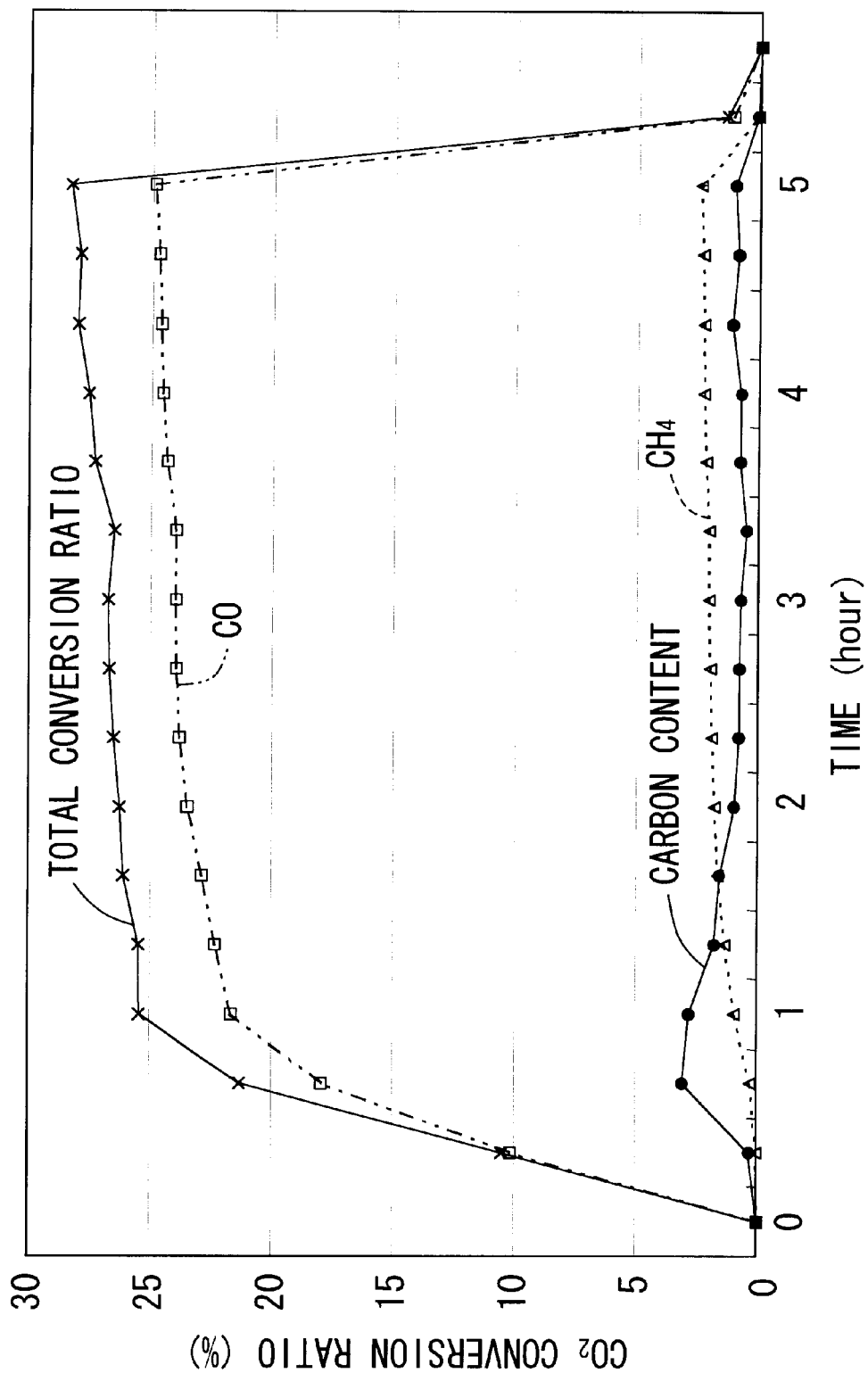
FIG. 16 illustrates reaction times and conversion ratios of carbon dioxide to respective products obtained by employing the 1% potassium-added cobalt metal powder catalyst (A) under further conditions in the eighth Example.

FIG. 16 shows the reaction times and the conversion ratios of carbon dioxide to respective products in the eighth Example. The horizontal axis shows the times (hour) and the vertical axis shows the carbon dioxide conversion ratios (%).

The gas from the reaction tube 10 was analyzed every temperature shown in FIG. 16, and the conversion ratios to carbon monoxide, methane and carbon, and the total conversion ratios were obtained similarly to the second comparative example.

As a result of weight measurement after the reaction, the quantity of the produced carbon was 0.0816 g, the mean conversion ratio of carbon dioxide gas to carbon was 1.7%, and the carbon deposition quantity was 1876 g-carbon/kg-cat·h.

NINTH EXAMPLE

The 1% potassium-added cobalt catalyst (A) was charged by 0.1268 g in the reaction tube 10 of the fixed bed reactor shown in FIG. 1 as the catalyst 12 and reduced under a hydrogen atmosphere at 400° C. for 1 hour. After the reduction, the weight of the catalyst 12 was 0.0990 g. Thereafter, the temperature of the reaction tube 10 was raised with the heating furnace 14, while a mixed gas containing nitrogen gas, carbon dioxide gas and hydrogen gas was supplied, for measuring the carbon amount produced from weight change before and after the reaction. In this reaction, nitrogen gas, carbon dioxide gas and hydrogen gas were in the ratios 1:3:6, the flow rate of the mixed gas was 100 ml/min., the reaction temperature was 410° C., and the reaction time was 1 hour.

Figure 17:
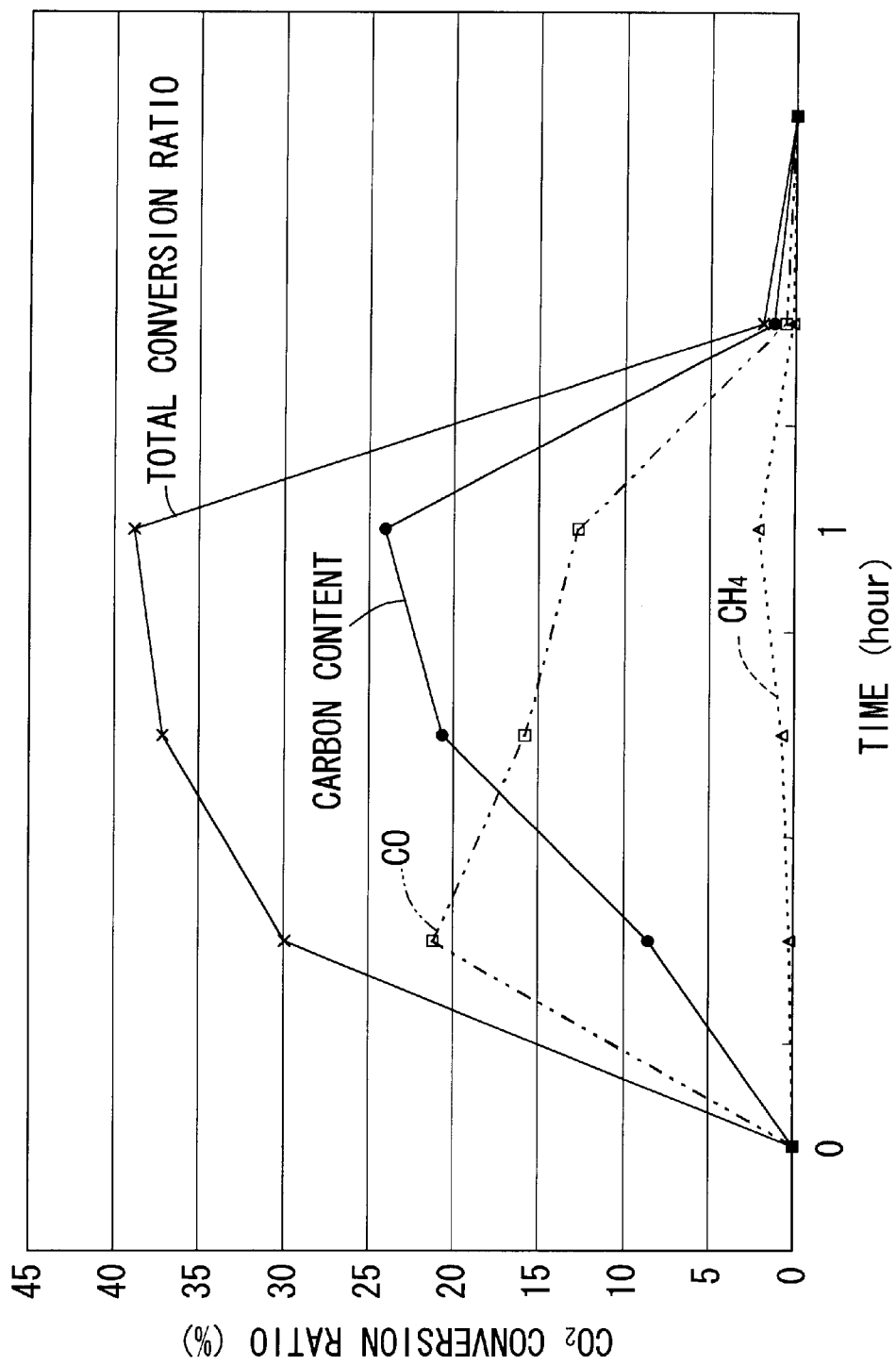
FIG. 17 illustrates reaction times and conversion ratios of carbon dioxide to respective products obtained by employing the 1% potassium-added cobalt metal powder catalyst (A) under further conditions in the ninth Example.

FIG. 17 shows the reaction times and the conversion ratios of carbon dioxide to respective products in the ninth Example. The horizontal axis shows the times (hour) and the vertical axis shows the carbon dioxide conversion ratios (%).

The gas from the reaction tube 10 was analyzed at every temperature shown in FIG. 17, and the conversion ratios to carbon monoxide, methane and carbon, and the total conversion ratios were obtained similarly to the second comparative example.

As a result of weight measurement after the reaction, the quantity of the produced carbon was 0.1619 g, the mean conversion ratio of carbon dioxide gas to carbon was 16.8%, and the carbon deposition quantity was 1635 g-carbon/kg-cat·h.

TENTH EXAMPLE

The 1% potassium-added cobalt catalyst (A) was charged by 0.1267 g in the reaction tube 10 of the fixed bed reactor shown in FIG. 1 as the catalyst 12 and reduced under a hydrogen atmosphere at 400° C. for 1 hour. After the reduction, the weight of the catalyst 12 was 0.0989 g. Thereafter, the temperature of the reaction tube 10 was raised with the heating furnace 14, while a mixed gas containing nitrogen gas, carbon dioxide gas and hydrogen gas was supplied, for measuring the carbon amount produced from weight change before and after the reaction. In this reaction, nitrogen gas, carbon dioxide gas and hydrogen gas were in the ratios 1:3:6, the flow rate of the mixed gas was 100 ml/min., the reaction temperature was 500° C., and the reaction time was 1 hour.

Figure 18:
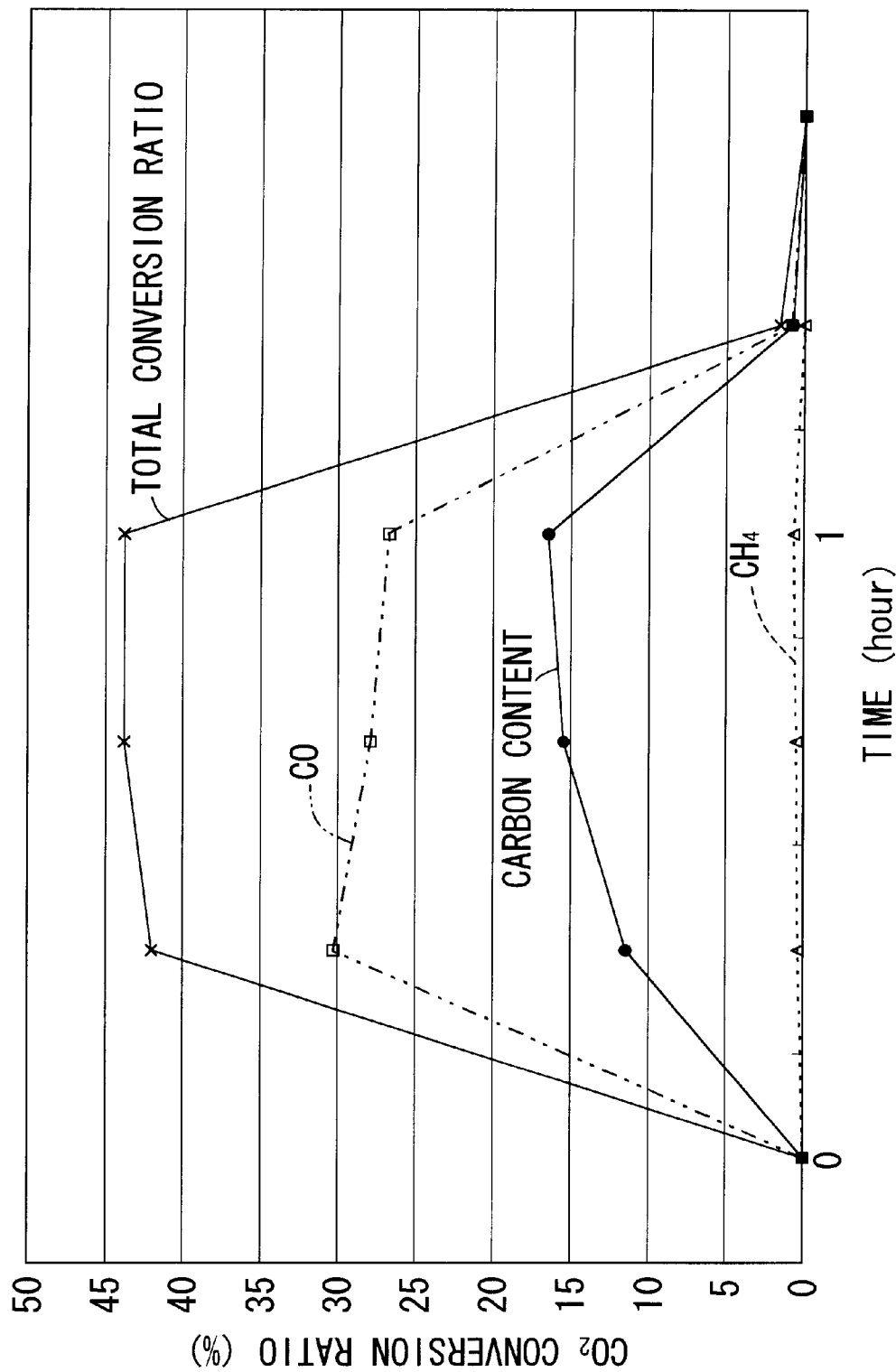
FIG. 18 illustrates reaction times and conversion ratios of carbon dioxide to respective products obtained by employing the 1% potassium-added cobalt metal powder catalyst (A) under further conditions in the tenth Example.

FIG. 18 shows the reaction times and the conversion ratios of carbon dioxide to respective products in the tenth Example. The horizontal axis shows the times (hour) and the vertical axis shows the carbon dioxide conversion ratios (%).

The gas from the reaction tube 10 was analyzed at every temperature shown in FIG. 18, and the conversion ratios to carbon monoxide, methane and carbon, and the total conversion ratios were obtained similarly to the second comparative example.

As a result of weight measurement after the reaction, the quantity of the produced carbon was 0.1357 g, the mean conversion ratio of carbon dioxide gas to carbon was 14.1%, and the carbon deposition quantity was 1372 g-carbon/kg-cat·h.

ELEVENTH EXAMPLE

The 1% potassium added nickel catalyst (B) was charged by 0.1039 g in the reaction tube 10 of the fixed bed reactor shown in FIG. 1 as the catalyst 12 and reduced under a hydrogen atmosphere at 400° C. for 1 hour. After the reduction, the weight of the catalyst 12 was 0.1015 g. Thereafter, the temperature of the reaction tube 10 was raised with the heating furnace 14, while a mixed gas containing nitrogen gas, carbon dioxide gas and hydrogen gas was supplied, for measuring the carbon amount produced from weight change before and after the reaction. In this reaction, nitrogen gas, carbon dioxide gas and hydrogen gas were in the ratios 1:3:6, the flow rate of the mixed gas was 100 ml/min., the reaction temperature was 500° C., and the reaction time was 1.75 hours.

Figure 19:
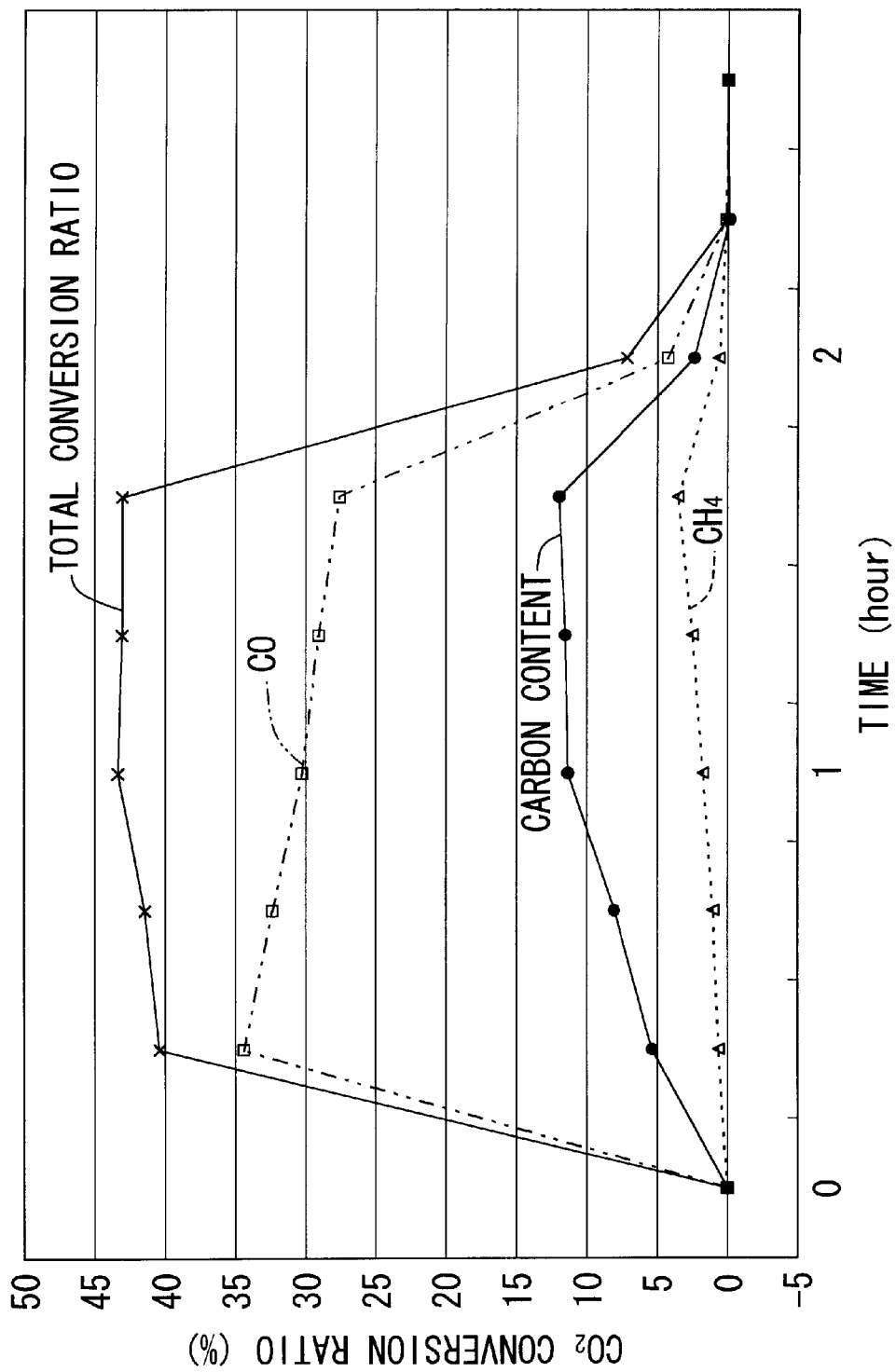
FIG. 19 illustrates reaction times and conversion ratios of carbon dioxide to respective products obtained by employing the 1% potassium-added nickel catalyst (B) in the eleventh Example.

FIG. 19 shows the reaction times and the conversion ratios of carbon dioxide to respective products in the eleventh Example. The horizontal axis shows the times (hour) and the vertical axis shows the carbon dioxide conversion ratios (%).

The gas from the reaction tube 10 was analyzed at every temperature shown in FIG. 19, and the conversion ratios to carbon monoxide, methane and carbon, and the total conversion ratios were obtained similarly to second comparative example.

As a result of weight measurement after the reaction, the quantity of the produced carbon was 0.1517 g, the mean conversion ratio of carbon dioxide gas to carbon was 9.0%, and the carbon deposition quantity was 854 g-carbon/kg-cat·h.

TWELFTH EXAMPLE

The 1% potassium-added nickel particle catalyst (C) was charged by 0.1043 g in the reaction tube 10 of the fixed bed reactor shown in FIG. 1 as the catalyst 12 and reduced under a hydrogen atmosphere at 400° C. for 1 hour. After the reduction, the weight of the catalyst 12 was 0.1022 g. Thereafter, the temperature of the reaction tube 10 was raised with the heating furnace 14, while a mixed gas containing nitrogen gas, carbon dioxide gas and hydrogen gas was supplied, for measuring the carbon amount produced from weight change before and after the reaction. In this reaction, nitrogen gas, carbon dioxide gas and hydrogen gas were in the ratios 1:3:6, the flow rate of the mixed gas was 100 ml/min., the reaction temperature was 500° C., and the reaction time was 3.25 hours.

Figure 20:
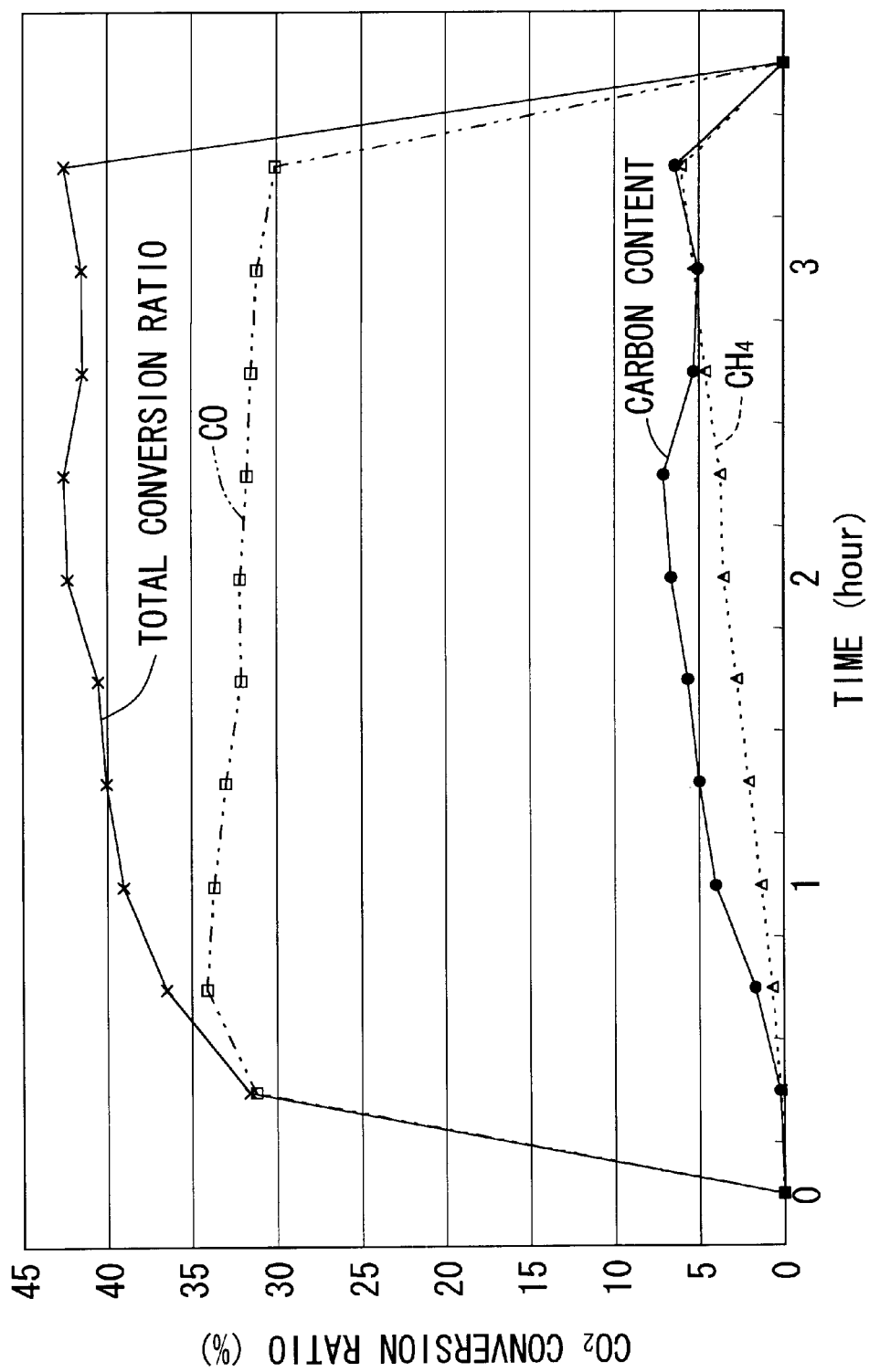
FIG. 20 illustrates conversion ratios of carbon dioxide to respective products obtained by employing a 1% potassium-added nickel particle catalyst (C) in the twelfth Example.

FIG. 20 shows the reaction times and the conversion ratios of carbon dioxide to respective products in the twelfth Example. The horizontal axis shows the times (hour) and the vertical axis shows the carbon dioxide conversion ratios (%).

The gas from the reaction tube 10 was analyzed at every temperature shown in FIG. 20, and the conversion ratios to carbon monoxide, methane and carbon, and the total conversion ratios were obtained similarly to the second comparative example.

As a result of weight measurement after the reaction, the quantity of the produced carbon was 0.1499 g, the mean conversion ratio of carbon dioxide gas to carbon was 4.8%, and the carbon deposition quantity was 451 g-carbon/kg-cat·h.

Comparing the data of the first Example employing the 1% potassium-added cobalt catalyst (A) with the data of the second comparative example employing the cobalt metal powder catalyst (a) as to temperature dependency of the catalytic reaction for producing carbon, the optimum catalyst temperature in the second comparative example was 510 to 520° C. while it was possible to lower the optimum catalyst temperature to 410 to 430° C. in first Example, and the maximum conversion ratio in the second comparative example was 6.8% while it was possible to improve the maximum conversion ratio to 18.0% in the first Example.

In the second Example employing the 1% potassium-added nickel catalyst (B), it was possible. to confirm deposition of carbon while no carbon was deposited in the fifth comparative example employing the nickel metal powder catalyst (b).

Comparing the data of the seventh Example employing the 1% potassium-added cobalt catalyst (A) with the data of the third comparative example employing the cobalt metal powder catalyst (a) as to the mean conversion ratios and the carbon deposition quantities of the catalysts for producing carbon, it is understood that both of the mean conversion ratios and the carbon deposition quantities in the present invention were improved.

In the eleventh Example employing the 1% potassium-added nickel catalyst (B), it was possible to confirm deposition of carbon while no carbon was deposited in the fifth comparative example employing the nickel metal powder catalyst (b).

In the twelfth Example employing the 1% potassium-added nickel particle catalyst (C), it was possible to confirm deposition of carbon while no carbon was deposited in the sixth comparative example employing the nickel metallic particle catalyst (c).

It is understood from these results that carbon producibility of the catalyst for producing carbon is improved by adding an alkaline metallic element to the catalyst for producing carbon mainly composed of nickel or cobalt, which is employed for producing carbon from mixed gas containing a carbon source.

Reduction of carbon dioxide release causing global warming is demanded on a word-wide scale. The inventive catalyst for producing carbon, which can produce carbon at lower energy as compared with the conventional method of producing carbon by reducing carbon dioxide, can efficiently contribute to curtailment of discharge of carbon dioxide.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of producing carbon by bringing a catalyst mainly composed of at least either nickel or cobalt with an alkaline metallic element added thereto into contact with mixed gas containing a carbon source.

2. The method of producing carbon according to claim 1, wherein
said catalyst is mainly composed of cobalt with potassium added thereto as said alkaline metallic component, said method making reaction under a condition of a reaction temperature of 350 to 550° C.

3. The method of producing carbon according to claim 2, making said reaction under a condition of a reaction temperature of 410 to 430° C.

4. The method of producing carbon according to claim 1, wherein
said catalyst is mainly composed of nickel with potassium added thereto as said alkaline metallic component, said method making reaction under a condition of a reaction temperature of 400 to 610° C.

5. The method of producing carbon according to claim 4, making said reaction under a condition of a reaction temperature of 480 to 600° C.

6. The method of producing carbon according to claim 1, wherein said mixed gas contains carbon dioxide as said carbon source.

7. The method of producing carbon according to claim 6, wherein said mixed gas further contains hydrogen.

8. A method of producing carbon comprising the steps of:
preparing a catalyst comprising one of nickel and cobalt with an alkaline metallic element, a weight ratio of alkaline metal to a total weight of said catalyst is approximately 1%; and
contacting said catalyst with a mixed gas, said mixed gas containg a carbon source.

9. The method of producing carbon according to claim 8, wherein potassium is said alkaline metallic element.

* * * * *